US012734692B2

(12) United States Patent
Smith

(10) Patent No.: US 12,734,692 B2
(45) Date of Patent: Sep. 15, 2026

(54) SYSTEMS AND METHODS FOR UNIFIED ORCHESTRATION OF ROBOTIC, DIGITAL, AND HUMAN RESOURCES

(71) Applicant: Zenyx Pty Ltd, Towen Mountain (AU)

(72) Inventor: Danny Francis Smith, Towen Mountain (AU)

(73) Assignee: Zenyx Pty Ltd, Towen Mountain (AU)

( * ) Notice: Subject to any disclaimer, the term of this patent is extended or adjusted under 35 U.S.C. 154(b) by 0 days.

(21) Appl. No.: 19/428,744

(22) Filed: Dec. 22, 2025

(65) Prior Publication Data

US 2026/0175423 A1 Jun. 25, 2026

Related U.S. Application Data

(60) Provisional application No. 63/738,781, filed on Dec. 25, 2024.

(51) Int. Cl.
*B25J 9/16* (2006.01)

(52) U.S. Cl.
CPC ............. *B25J 9/1661* (2013.01); *B25J 9/161* (2013.01); *B25J 9/163* (2013.01)

(58) Field of Classification Search
CPC ........... B25J 9/1661; B25J 9/161; B25J 9/163
See application file for complete search history.

(56) References Cited

U.S. PATENT DOCUMENTS

| | | | | |
|---|---|---|---|---|
| 12,493,904 | B2 * | 12/2025 | Sahoo | G06Q 10/0637 |
| 12,518,109 | B1 * | 1/2026 | Deutsch | G06F 40/35 |
| 2017/0293844 | A1 | 10/2017 | Gombolay | |
| 2023/0219228 | A1 | 7/2023 | Cella et al. | |
| 2024/0004403 | A1 | 1/2024 | Alagic et al. | |

FOREIGN PATENT DOCUMENTS

| | | | |
|---|---|---|---|
| KR | 20220088333 | A | 6/2022 |
| WO | WO 2019234702 | A2 | 12/2019 |

OTHER PUBLICATIONS

Zenyx Pty Ltd, International Search Report and Written Opinion, PCT/AU2025/051493, Apr. 20, 2026, 12 pgs.

* cited by examiner

*Primary Examiner* — Ian Jen
(74) *Attorney, Agent, or Firm* — SankerIP

(57) ABSTRACT

The various implementations described herein include systems and methods for workflow management. In one aspect, a method includes identifying labor resources. Each labor resource has a respective profile that specifies capabilities of the respective labor resource. The method further includes receiving a request for a workflow and in response to receiving the request: (i) generating tasks to be performed for the workflow and (ii) assigning one or more of the labor resources to each generated task. The method also includes, at a first time, executing the workflow corresponding to the request, including transmitting a command to a labor resource that is assigned to a task.

20 Claims, 12 Drawing Sheets

Figure 3A:
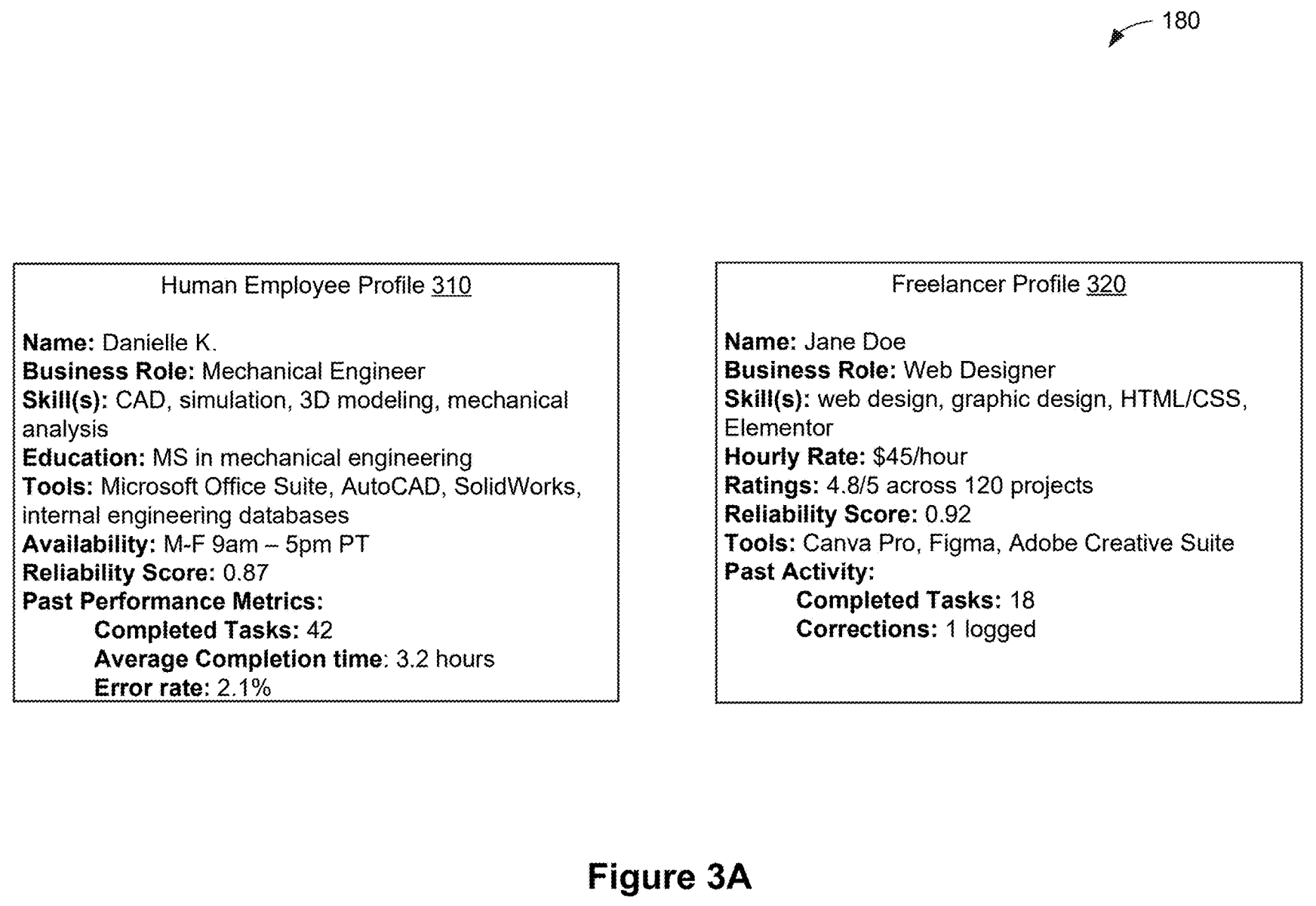

180

Human Employee Profile 310

Name: Danielle K.
Business Role: Mechanical Engineer
Skill(s): CAD, simulation, 3D modeling, mechanical analysis
Education: MS in mechanical engineering
Tools: Microsoft Office Suite, AutoCAD, SolidWorks, internal engineering databases
Availability: M-F 9am – 5pm PT
Reliability Score: 0.87
Past Performance Metrics:
- Completed Tasks: 42
- Average Completion time: 3.2 hours
- Error rate: 2.1%

Freelancer Profile 320

Name: Jane Doe
Business Role: Web Designer
Skill(s): web design, graphic design, HTML/CSS, Elementor
Hourly Rate: $45/hour
Ratings: 4.8/5 across 120 projects
Reliability Score: 0.92
Tools: Canva Pro, Figma, Adobe Creative Suite
Past Activity:
- Completed Tasks: 18
- Corrections: 1 logged

Figure 3B:
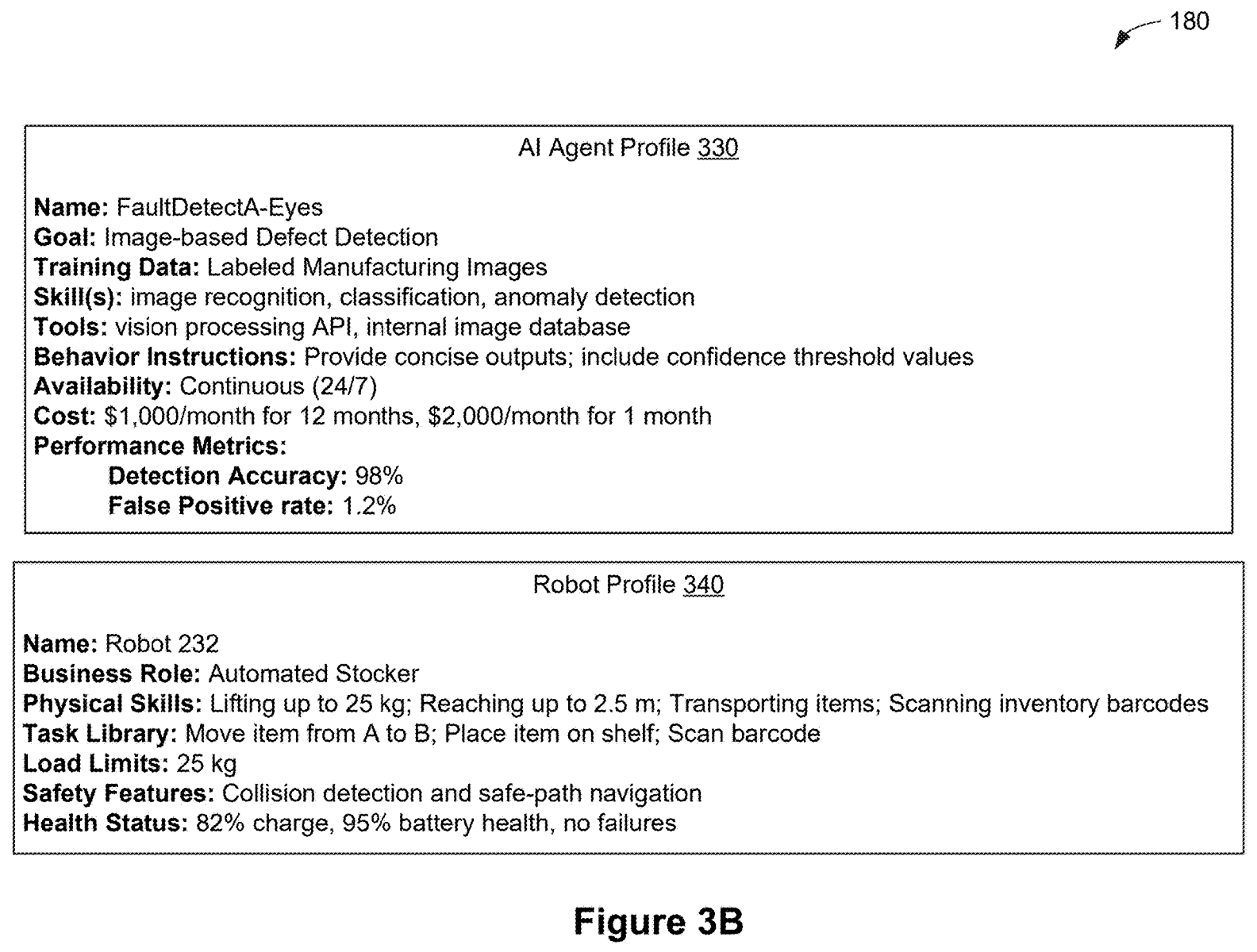

AI Agent Profile 330

Name: FaultDetectA-Eyes
Goal: Image-based Defect Detection
Training Data: Labeled Manufacturing Images
Skill(s): image recognition, classification, anomaly detection
Tools: vision processing API, internal image database
Behavior Instructions: Provide concise outputs; include confidence threshold values
Availability: Continuous (24/7)
Cost: $1,000/month for 12 months, $2,000/month for 1 month
Performance Metrics:
Detection Accuracy: 98%
False Positive rate: 1.2%

Robot Profile 340

Name: Robot 232
Business Role: Automated Stocker
Physical Skills: Lifting up to 25 kg; Reaching up to 2.5 m; Transporting items; Scanning inventory barcodes
Task Library: Move item from A to B; Place item on shelf; Scan barcode
Load Limits: 25 kg
Safety Features: Collision detection and safe-path navigation
Health Status: 82% charge, 95% battery health, no failures

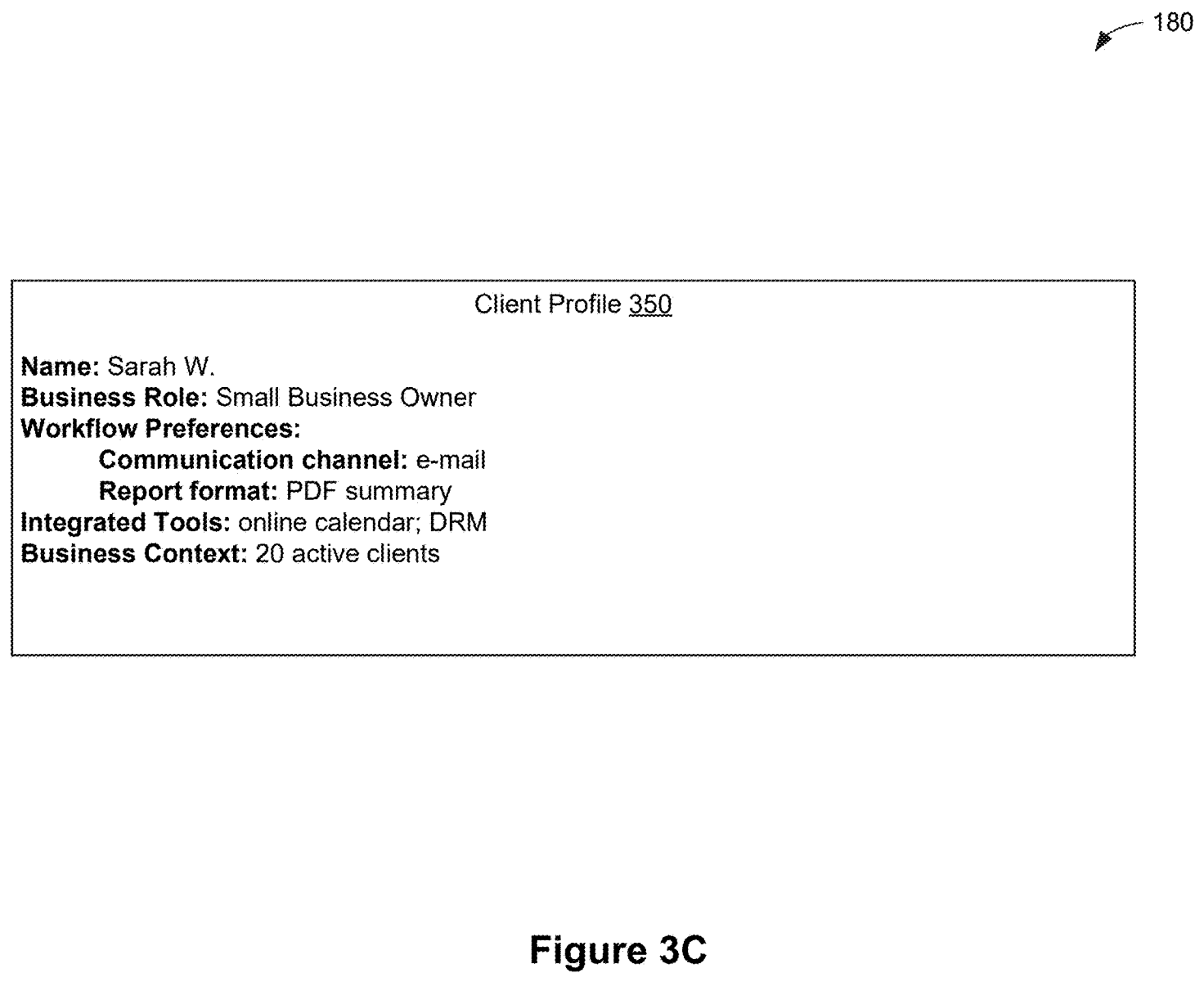

Client Profile 350

Name: Sarah W.
Business Role: Small Business Owner
Workflow Preferences:
Communication channel: e-mail
Report format: PDF summary
Integrated Tools: online calendar; DRM
Business Context: 20 active clients

Figure 3C

SYSTEMS AND METHODS FOR UNIFIED ORCHESTRATION OF ROBOTIC, DIGITAL, AND HUMAN RESOURCES

RELATED APPLICATIONS

This application claims the benefit of and priority to U.S. Provisional Patent Application No. 63/738,781, filed Dec. 25, 2024, entitled "A Prompt-Based Workflow Generation System with AI-Driven Resource and Tool Selection," which is incorporated by reference herein in its entirety.

TECHNICAL FIELD

The disclosed implementations relate generally to operation of a unified workforce and more specifically to systems and methods of using artificial intelligence to implement operation of a unified workforce.

BACKGROUND

Traditional workflow management systems often rely on predefined, static workflows that are manually configured. These systems require significant time and effort to set up and adapt to changes in the operational needs. Additionally, these systems typically do not account for real-time data and evolving conditions. Static workflows are unable to dynamically adjust based on changes in input variables, task dependencies, resource availability, or other dynamic factors, resulting in inefficiencies and missed opportunities.

Therefore, there is a need for more intelligent, adaptable systems that can automatically generate, optimize, and adjust workflows in real-time based on current data, goals, and task complexities. Artificial intelligence (AI) offers great potential for addressing these challenges by enabling systems to learn from patterns, predict outcomes, and dynamically generate workflows that are more responsive and efficient.

SUMMARY

Disclosed are new systems and methods that utilize artificial intelligence (AI) for automated workflow generation and automated orchestration of a unified workforce for executing a workflow, including resource selection and allocation, task deployment, and intelligent learning and updating.

The systems and methods disclosed herein provide automated workflow generation, resource allocation, and task management. The workflows are context-aware, dynamically generated, and adaptable based on real-time resource availability and task requirements. The system automatically generates workflows (including tasks), assigns suitable resources for the tasks, and manages execution of the workflow.

In accordance with some implementations, a method includes identifying a plurality of labor resources. The plurality of labor resources includes one or more robotic resources. Each labor resource has a respective profile that specifies digital and physical capabilities of the respective labor resource. For at least one of the labor resources, the capabilities include at least one physical capability to perform predefined physical actions. The method also includes receiving a request for a workflow and in response to receiving the request: (i) generating a plurality of tasks to be performed for the workflow and (ii) assigning a respective set of one or more of the labor resources for each task of the plurality of tasks. The method further includes, at a first time, executing the workflow corresponding to the request, including transmitting a first command to a first labor resource is assigned to a first task of the plurality of tasks. The first command includes instructions for a first controller that is configured to control actions of the first labor resource.

In accordance with some implementations, a system includes a user interface module configured to receive user input, an input processing module configured to interpret the user input and generate an input request based on the user input, and a workflow generation module configured to generate a workflow based on the input request. The workflow includes a plurality of tasks and respective task information for a respective task of the plurality of tasks includes one or more task requirements for completing the task. The system further includes a resource module configured to, for a respective task of the plurality of tasks: (i) identify candidate labor resources from a plurality of labor resources, each of the candidate labor resources includes respective capabilities; (ii) select a respective labor resource from the labor candidate resources based on the respective capabilities of the respective labor resource and the respective task information for the respective task; and (iii) assign the selected labor resource to the respective task. The system further includes an orchestration module configured to execute the workflow, including transmitting respective commands to respective labor resources assigned to respective tasks. The plurality of tasks includes a first task, and the orchestration module is configured to transmit a first command that includes instructions for a first controller that is configured to control actions of a first labor resource that is assigned to the first task.

In some implementations, a computing device includes one or more processors, memory, a display, and one or more programs stored in the memory. The programs are configured for execution by the one or more processors. The one or more programs include instructions for performing any of the methods described herein.

In some implementations, a non-transitory computer-readable storage medium stores one or more programs configured for execution by a computing device having one or more processors, memory, and a display. The one or more programs include instructions for performing any of the methods described herein.

In various circumstances, the systems and methods for automated workflow generation and management of the present disclosure have the following advantages over conventional systems and methods of generating and managing workflows. First, in accordance with some implementations, workflows are typically generated and managed by a human manager, which can be expensive, time consuming, and prone to error. Second, in instances where at least portions of workflow generation and management are automatically handled, the automated systems utilize static templates that are not adaptable and end up generating more work than creating a streamlined and automated process. Third, most workflow management systems stop at workflow and task generation and are unable to determine available resources and appropriately allocate available resources to specific tasks. Fourth, most workflow management systems also lack features to track the progress of specific tasks and the overall progress of the workflow. Fifth, existing workflow management systems fail to consider alternate or unconventional resources, such as free-lance resources, robots, and AI agents.

Thus, methods and systems are disclosed for automated workflow generation and management. Such methods and systems may complement or replace conventional methods and systems of workflow generation.

BRIEF DESCRIPTION OF THE DRAWINGS

For a better understanding of the aforementioned systems, methods, and graphical user interfaces, as well as additional systems, methods, and graphical user interfaces that provide automated workflow orchestration, reference should be made to the Description of Implementations below, in conjunction with the following drawings in which like reference numerals refer to corresponding parts throughout the figures.

FIGS. 3A and 3B provide examples of profiles for various types of labor resources in accordance with some implementations.

FIG. 3C provides an example of a client profile in accordance with some implementations.

Reference will now be made to implementations, examples of which are illustrated in the accompanying drawings. In the following description, numerous specific details are set forth in order to provide a thorough understanding of the present invention. However, it will be apparent to one of ordinary skill in the art that the present invention may be practiced without requiring these specific details.

DESCRIPTION OF IMPLEMENTATIONS

Systems and methods of the present disclosure enable automated generation and orchestration of a workflow based on a user request. The systems and methods disclosed herein include selection, allocation, and deployment of a labor resources in a unified workforce for executing tasks in the workflow. The unified workforce includes various types of labor resources, such as artificial intelligent (AI) agents (including AI employees), robotics resources (e.g., automated robotics), and human agents (such as human employees, contractors, and freelancers). Tasks are assigned to labor resources based on comparison of the capabilities (e.g., skills, expertise, rating, availability) of the labor resource to the requirements of the task. Feedback on completed tasks are also used to update the workflow (including updating task information) and to update profiles of the labor resources.

Figure 1A:
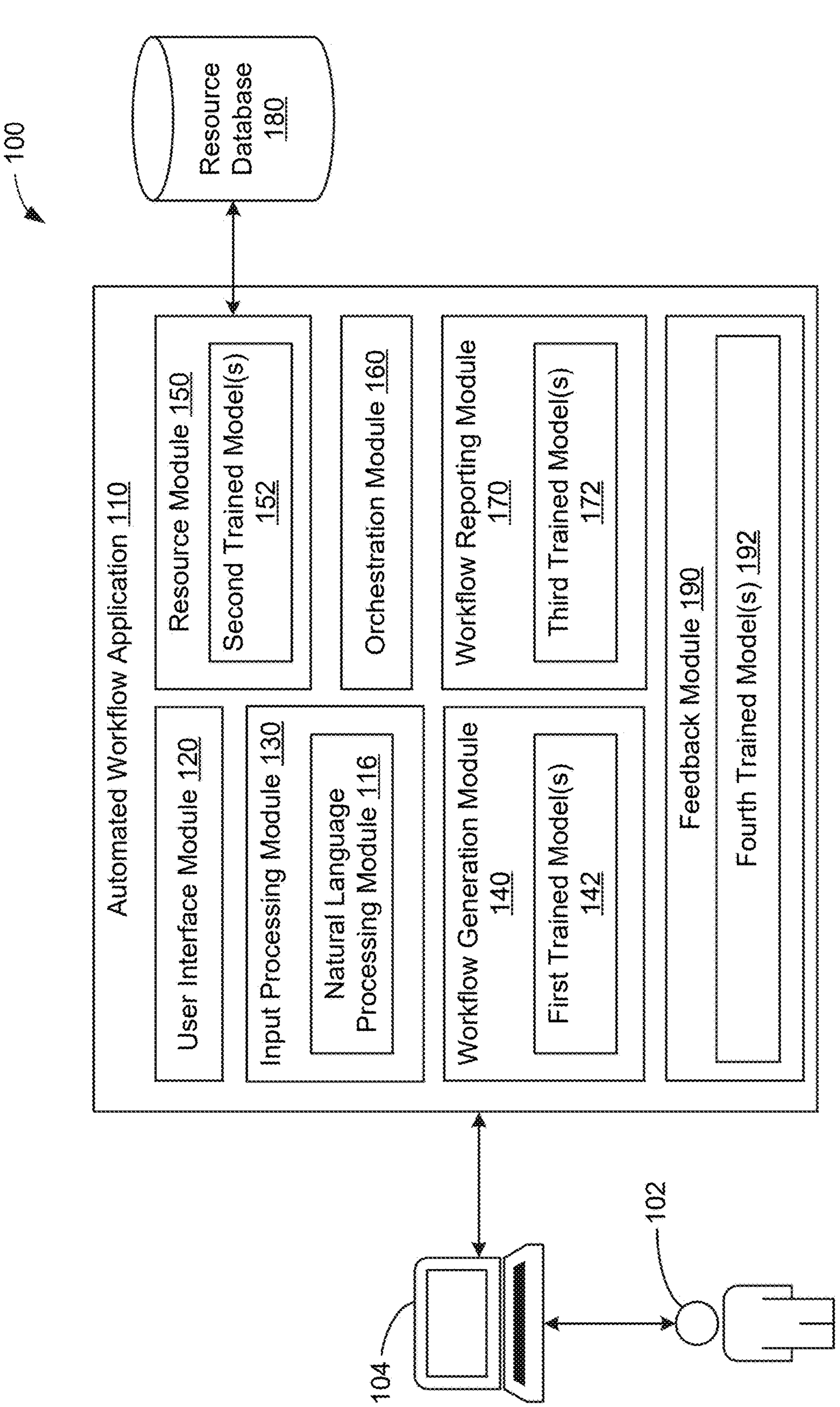
FIG. 1A provides an example system in accordance with some implementations.

FIG. 1A provides an example system 100 in accordance with some implementations. The system 100 includes automated workflow application 110, a user device 104 that can receive user input provided by a user 102 (e.g., a client) and display information to the user 102, and a resource database 180 that stores information regarding a plurality of labor resources. The automated workflow application 110 includes a user interface module 120 that is configured to receive user inputs provided by the user 102 via the user device 104, an input processing module 130 that is configured to process (e.g., analyze, interpret, contextualize) user input received at the user interface module 120. In some implementations, the input processing module 130 includes a natural language processing module 116 that is configured to perform natural language processing on the user input. In some implementations, the input processing module 130 generates an input request based on the received user input.

The automated workflow application 110 also includes a workflow generation module 140 that is configured to generate a workflow based on the input request. The workflow includes a plurality of tasks and each task includes task information. In some implementations, the task information includes task requirements which indicate what capabilities (e.g., skills, expertise, experience) are required to complete the task. In some implementations, the workflow generation module 140 includes one or more trained models 142 that are configured to receive the input request and generate a workflow, including tasks and task information, based on the input request.

The automated workflow application 110 also includes a resource module 150 that is configured to select and assign labor resources to tasks within the workflow. In some implementations, the resource module 150 is in communication with a resource database 180 that stores information regarding the plurality of labor resources. A respective labor resource is associated with a respective profile (e.g., labor profile, labor resource profile, resource profile) that includes information regarding the respective labor resource. Information regarding a labor resource can include any of: availability (e.g., currently available, not currently available, availability schedule, current workload or queue), resource type classification (e.g., freelance, automated robot, human employee, AI employee), cost (e.g., $50/hour, $200/task), capabilities (e.g., areas of expertise, available tools, trained programs, years of experience), and ratings (e.g., highly rated, 3/5 rating). In some implementations, the resource module 150 includes one or more second trained models 152 that are configured to select a labor resource (from the plurality of labor resources) to a task based on the task information and the profile of the labor resource.

The automated workflow application 110 further includes an orchestration module 160 that is configured to execute the workflow, including coordinating task assignments, tracking task progress, triggering new or recurring tasks, and updating task information and/or labor resource profiles as needed based on feedback on completed tasks.

In some implementations, the workflow is a recurring workflow that is executed repeatedly (e.g., once a day, once a month, once a quarter). In some implementations, the workflow includes one or more recurring tasks that are executed repeatedly (e.g., once a day, once a month, once a year). In some implementations, execution of a recurring workflow and/or recurring task is in response to a trigger (e.g., a recurring date/time, event trigger, time frame, time period). For example, a workflow to update marketing materials may be triggered in response to a determination that a product specification has been updated, execute the workflow for updating marketing materials, websites, and social media outlets). In another example, execution of a recurring task within a workflow can be triggered to occur every Monday at 9:00:00 AM PT.

In some implementations, execution of the recurring task is in response to a trigger (e.g., in response to a determination that a product specification has been updated, execute the workflow for updating marketing materials, websites, and social media outlets).

The automated workflow application also includes a workflow reporting module 170 that is configured to collect feedback regarding completed tasks and generate a report for each completed task. The information in the report is used to update task information and/or labor resource profile(s). The report includes any of: (i) feedback from any labor resource that is assigned to a task in the same workflow, (ii) a reassignment alert, and (iii) a rating. For example, a task report may include information regarding whether the task was reassigned, whether any delays were noted, and what specific actions were completed.

Feedback for a completed task is provided by the labor resource that was assigned to and completed the task and/or by another labor resource that uses output(s) from the task. For example, the feedback for a first task may include an indication that the labor resource is assigned to the first task needed a specific piece of information that was not initially provided in order to complete the task, or that it required access to additional tools to complete the first task (e.g., needed access to spreadsheet editing software to complete task). In another example, another labor resource is assigned to a second task (e.g., another task that is different from the first task) uses the spreadsheet generated (e.g., output) from the first task. The labor resource is assigned to a second task can provide feedback on the spreadsheet output from the first task (e.g., "incorrect date formatting in column 72", or "spreadsheet incomplete-missing revenue forecast analysis"). Feedback included in the report can be used to update the workflow, update task information for tasks in the workflow, and/or update labor resource profiles. For example, a workflow may be updated to include an additional task based on feedback in a report. In another example, task information for a task maybe updated to include a requirement that an assigned labor resource has access to spreadsheet editing software and has skills for forecasting. In yet another example, the labor resource is assigned to the first task can receive feedback that it needs to be trained to perform forecasting and once trained, the profile for the labor resource is updated to indicate the added capability.

A reassignment alert indicates whether or not the task was reassigned, either to the same resource or a different resource. For example, a first task that is assigned to a first labor resource may be marked as complete, but upon review by a second labor resource is assigned to a second task that uses output generated by the first task, the second labor resource determines that the output is either incomplete or includes errors that need to be corrected. The second labor resource can reassign the first task to the first labor resource and note that the first labor resource did not complete the first task satisfactorily. The first labor resource can redo the first task or, in the case where the first labor resource is no longer available or in the case where the first labor resource is considered to not be suitable for completing the first task (e.g., the first labor resource indicated in its feedback that it requires access to spreadsheet editing software to complete the task and does not currently have access to spreadsheet editing software) the first task is reassigned to another labor resource that is different from the first labor resource. The reassignment alert and any reasons associated with the reassignment can be used to update the workflow, update task information for tasks in the workflow, and/or update labor resource profiles. For example, the first labor resource may be updated to include access to spreadsheet editing software, and the profile for the first labor resource is updated to indicate the added capability. In another example, the task information for the first task is updated to include access to spreadsheet editing software as a requirement. In yet another example, the workflow may add a new task between the first task and the second task, where the new task to review the output from the first task and is assigned to a human labor resource.

A rating can include a rating provided by any labor resource that is assigned to a task in the same workflow. For example, a second labor resource can rate the output of the first task as a 4/5 due to date formatting errors (but complete and correct information). This rating and corresponding feedback is used to update (e.g., edit) any of the workflow, the task information for tasks in the workflow, and/or profile for a labor resource is assigned to the first task. For example, the task information may be updated to include instructions regarding formatting.

In some implementations, the workflow reporting module 170 includes one or more third trained models 172 that are configured to receive feedback on completed tasks and generate reports for completed tasks.

The automated workflow application 100 also includes a feedback module 190 that is configured to update aspects of the workflow based on reports generated by the workflow reporting module 170. For example, the feedback module 190 may update the workflow (e.g., add, change, remove, reorder tasks within the workflow), update tasks (e.g., update task requirements), and/or update labor resource profiles based on information from report(s). In some implementations, the feedback module 190 includes fourth trained models 192 to analyze information from reports and update the workflow, tasks, and/or labor resource profiles. For example, the fourth trained models 192 may include a trained model (e.g., an AI model referred to herein as a "trained evaluator model") that is configured to analyze information in the reports and determine if any errors are systematic errors or errors that can be prevented in future iterations or workflow implementations. In some implementations, the trained evaluator model is trained to generate an analysis score based on the analysis of reports. In such cases, the analysis score is used to determine whether changes to the workflow, tasks, and/or labor resource profiles is appropriate (e.g., required). In some implementations, the analysis score is calculated (e.g., computed) based on: feedback, reassignment alert(s), and rating(s) in the report(s).

The fourth trained models 192 also include another trained model (e.g., an AI model referred to herein as a "trained improver model") that is configured to analyze the current state of the workflow, identify and propose potential changes or improvements to the workflow, tasks, and/or labor resource profiles, and implement approved proposed changes. In some implementations, the proposed changes are approved by a human reviewer. In some implementations, the trained improver model is configured to provide information linking each proposed change to an input (e.g., a portion of a report), thereby providing explainability and a clear thought process that can be easily understood by the human reviewer.

In some implementations, the trained evaluator model is trained to generate an analysis score based on the analysis of reports. In accordance with a determination that the analysis score meets (e.g., is equal to or greater than) a threshold value (e.g., a predetermined threshold value), the trained improver model is triggered to update the workflow, tasks, and/or labor resource profiles.

As shown in the examples provided above, the automated workflow application 110 is able to flexibly adapt and improve its performance by using information in the reports to improve workflow (e.g., by adding and/or removing tasks, rearranging task order), improve task information (including task definition and requirements), and refine and train the workforce (e.g., include more labor resources with a specific capability that is often requested and understaffed, train more labor resources to perform a specific function, provide access to specific tools that are needed to complete tasks).

Figure 1B:
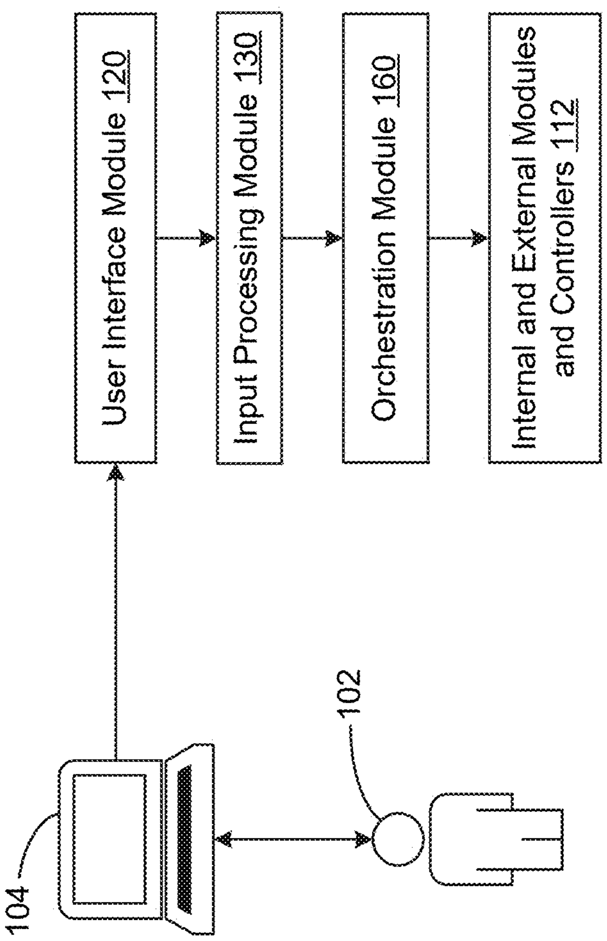
FIG. 1B provides an example system structure in accordance with some implementations.

FIG. 1B provides an example system structure in accordance with some implementations. As described above with respect to FIG. 1A, the workflow application 110 includes an orchestration module 160 that acts as a central coordinator. In some implementations, the orchestration module 160 includes multiple layers for ingesting information, generating instructions, and interfacing with modules and controllers. In some implementations, the orchestration module 160 can be understood as a server that includes protocols and interfaces similar to a module context protocol (MCP) server, allowing various modules and AI agents to seamlessly interact with one another.

For example, when a user request or user input is received at the user interface module 120 of the workflow application 110, the user input is transmitted to the input processing module 130 to determine context and intent. The context and intent can be formatted into a data structure that is readable by the orchestration module 160 (such as in a JSON file) and transferred to the workflow generation module 140 via the orchestration module 160 so that the workflow generation module 140 can generate tasks and task requirements. Task and task requirements can then be transmitted from the workflow generation module 140 to the resource module 150 via the orchestration module 150 so that the resource module 150 can assign resources to each of the generated tasks. During execution, the orchestration module 160 may generate instructions for different controllers and modules as the workflow is executed. For example, the orchestration module 160 may generate instructions to be transmitted to a controller of a robotic resource so that the robotic resource can perform specific actions to complete a task. In another example, the orchestration module 160 may provide (e.g., include) an application programming interface (API) that allows an AI agent to utilize one or more internet tools, such as access and perform functions on an e-commerce platform. As tasks are completed, information regarding the tasks and feedback from labor resources can be transmitted to the workflow reporting module 170 via the orchestration module 160. Thus, the orchestration module 160 acts as a facilitator or intermediary between various internal and external modules and controllers that are part of the system. In some implementations, as shown, various modules, controllers, and AI agents maintain their structures and actions independent from the orchestration module 160 (e.g., trained models 142 and logic that is part of the workflow generation module 140 are not absorbed into or part of the orchestration module 160). Thus, the orchestration module 160 allows the entire workflow generation, execution, and improvement process to be coordinated by one centralized module.

Figure 2A:
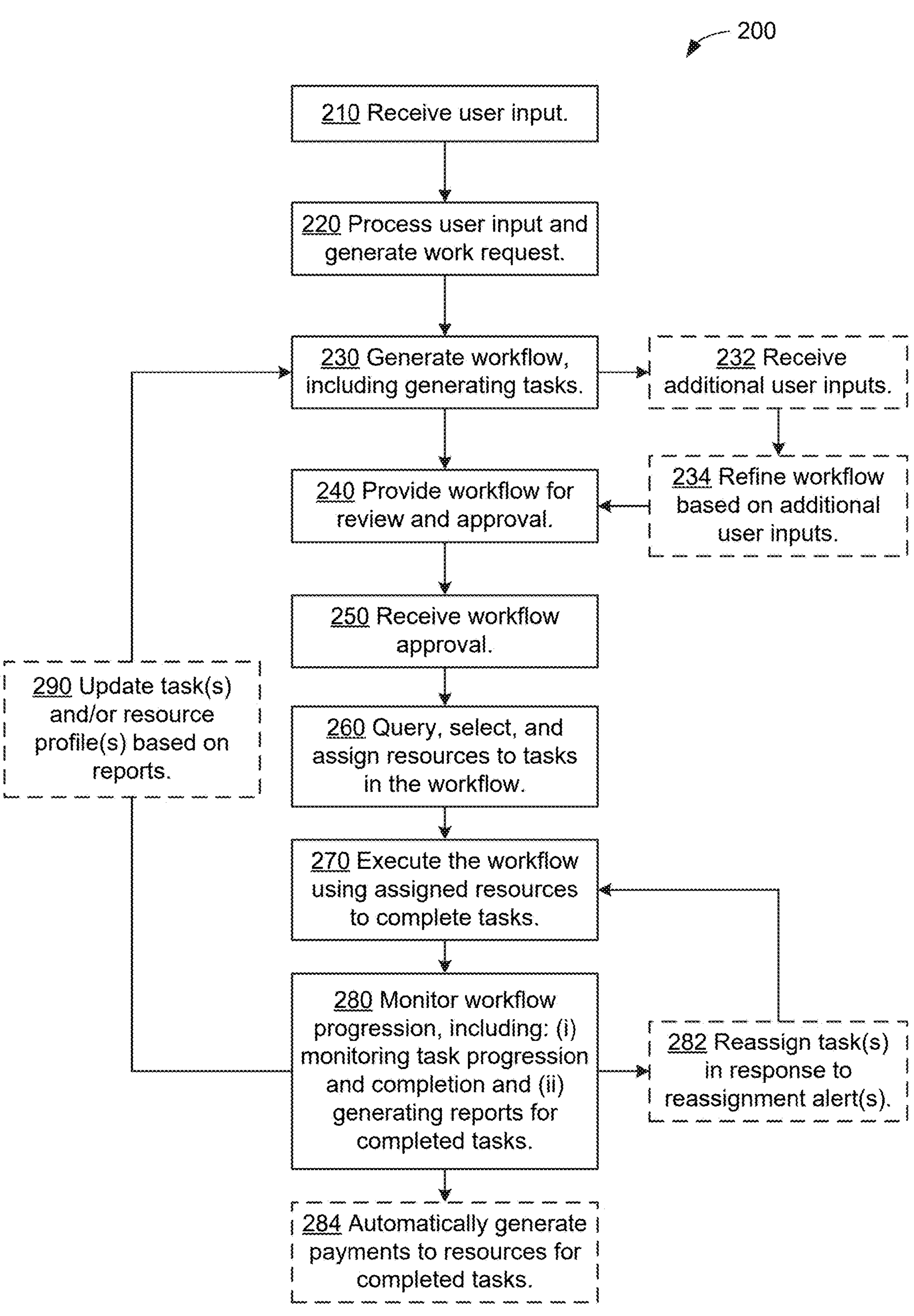
FIGS. 2A and 2B provide an example process for automatically executing a workflow in accordance with some implementations.
Figure 2B:
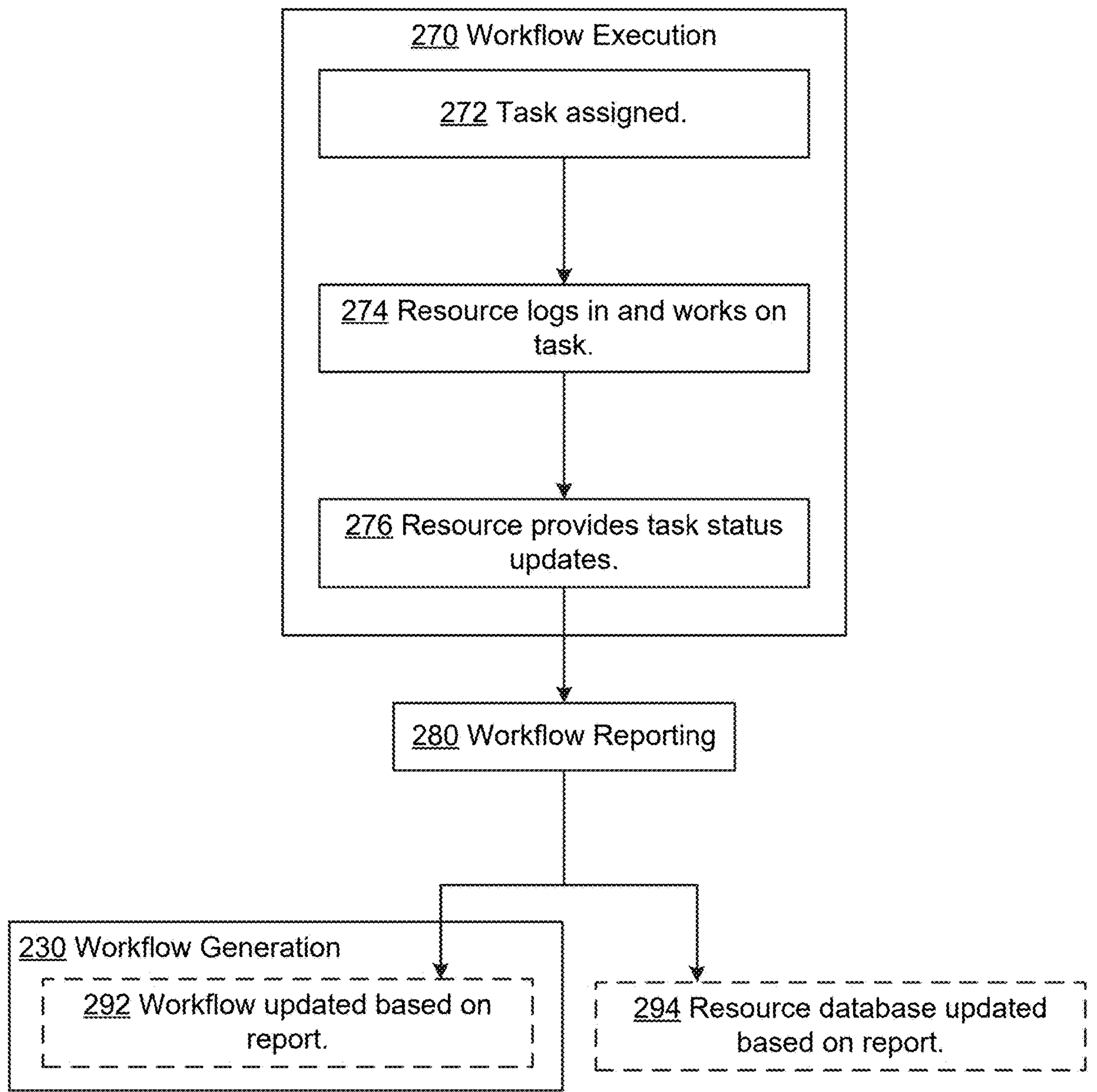

FIGS. 2A and 2B provide an example process 200 for automatically generating and executing a workflow in accordance with some implementations. The process 200 includes receiving (step 210) a user input (e.g., via a user device 104) and processing (step 220) the user input to generate a work request. In some implementations, processing the user input includes performing natural language processing on the user input to understand context details of any requests and instructions in the user input, so that important information from the user input is included in (e.g., reflected in) the work request. The process 200 further includes generating (step 230) a workflow, including generating tasks within the workflow, and providing (step 240) the workflow for review and approval (e.g., by the user). In some implementations, the process 200 includes receiving (step 232) additional user inputs from the user and refining (step 234) the workflow based on additional user inputs. For example, the user may add more information that they had unintentionally omitted from the initial user input (e.g., "I want this analysis done weekly"). In another example, the user may provide additional information in response to a request for more information (e.g., "Yes, I want a user to review the final product before sending to the client").

The process 200 further includes receiving (step 250) approval for the workflow and in response to a determination that the workflow has been approved, querying (step 260) the labor resource database for candidate labor resources for each task in the workflow, selecting one or more labor resources to be assigned to each task in the workflow (e.g., based on a comparison of task information or task requirements with labor resource capability as indicated in a labor resource profile), and assigning selected labor resources to tasks in the workflow.

In some implementations, selecting and assigning (e.g., allocating) one or more labor resources to a task includes determining capability requirements for the task (e.g., based on task requirements) and identifying candidate labor resources that include capabilities (e.g., as indicated in the labor resource profile) that match the capability requirements for the task. The capabilities for each of the candidate labor resources are weighted, and an allocation score is calculated for each of the candidate labor resources based on the weighted capabilities. One or more labor resources are selected and assigned to the task based on the allocation scores (e.g., labor resource(s) with the highest score(s) are selected and assigned to the task). In some implementations, the allocation score for a candidate labor resource is calculated based on information in the profile for each of the candidate labor resource, including cost, availability, and/or reliability. In some implementations, the allocation score for a candidate labor resource is calculated based on real-time information regarding a capability of the candidate resource (e.g., current battery charge level for a robotic resource, current queue or wait time for an AI agent).

In some implementations, the capabilities of candidate labor resources are weighted dynamically (e.g., ad hoc, at the time of labor resource assignment to a task). In some implementations, the capabilities of candidate labor resources are weighted based on the capability requirements for the task. For example, the candidate labor resource may include 13 capabilities, only 2 of which are identified as capability requirements for the task. In such cases, the other 11 capabilities (which are not identified as capability requirements for the task) may be weighted with a small coefficient (such as 0.0 or 0.1) and the two capabilities that match with capability requirements for the task are weighted with a high coefficient (e.g., 9.9 or 9.2). Thus, the weights are task-specific weights (e.g., determined separately for each task).

In some implementations, each labor resource includes field-level numeric weights that are used in calculating the allocation score for a task. For example, the following information in a profile may be associated with a field-level numeric weight: cost, reliability, battery threshold, tool access, and ratings.

In some implementations, the availability for a resource is a dynamic factor that is determined using (e.g., derived from) a per-resource calendar (that includes, for example, time-slot data). The calendar can be incorporated into the allocation score such that tasks are scheduled only in available windows. For example, a robotic resource may have its own calendar to prioritize and sequence physical tasks.

For example, availability for a labor resource is determined dynamically from the corresponding per-resource calendar that specifies available time slots, and the calendar-derived availability is included as a weighted input to per-task allocation scoring alongside other profile information (e.g., cost, reliability, capabilities, battery thresholds, safety clearance, and load limits) for the labor resource.

The process 200 also includes executing (step 270) the workflow using the assigned labor resources to complete each of the tasks. Tasks are completed in accordance with a sequence specified by the workflow. In some implementations, when the workflow permits, one or more tasks may be executed and/or completed in parallel to one another. In some implementations, the tasks are executed and/or completed sequentially as required by the workflow.

The process 200 also includes monitoring (step 280) workflow progression, including (i) monitoring task progress and task completion, and (ii) generating reports for completed tasks.

In some implementations, the process 200 also includes updating (step 290) the workflow, task information, and/or labor resource profiles based on information in reports for completed tasks. This closed-loop feedback allows the process 200 to improve the workflow for the next execution. This step is particularly valuable when generating recurring workflows or workflows with recurring tasks. For workflows that are not recurring (or do not include recurring tasks), the closed-loop feedback is still important as it can provide information on what additional capabilities (e.g., knowledge, training, access to tools) may be needed to complete specific tasks. Thus, labor resources can be updated with the appropriate training so that they are better able to handle future tasks and requests. Additionally, performance of the labor resource will be reflected in the labor resource profile, thereby decreasing the amount of work assigned to poor performers and instead, assigning work to well rated, capable, high performing labor resources.

In some implementations, such as when there is an indication or alert (e.g., via feedback, such as in a report) that a task needs to be reassigned, the process 200 includes reassigning (step 282) the identified task. In some implementations, such as when the task has errors or is incomplete, the task is reassigned to the same labor resource that was originally assigned to complete the task. In some implementations, such as when the originally assigned labor resource is unavailable or in response to a determination that the originally assigned labor resource is not capable of completing the task to satisfaction (e.g., lacks one or more capabilities required to complete the task and/or lacks access to a tool required to complete the task), the task is reassigned to a labor resource that is different from the originally assigned labor resource.

In some implementations, such as when the completed task was assigned to and completed by a freelance labor resource or a consultant labor resource, the process 200 includes automatically generating (step 284) payments to the labor resource is assigned to the completed task.

In some implementations, an orchestration module 160 (e.g., an orchestration layer) is configured to coordinate all aspects of process 200 (e.g., generating, executing, and updating the workflow).

As shown in FIG. 2B, during the workflow execution (step 270, also shown in FIG. 2A), each task is assigned (step 272) to one or more labor resources (e.g., one or more labor resources is assigned to each task in the workflow). For each assigned task, the labor resource(s) assigned to the task logs in (step 274) and works to complete the task. The labor resource(s) provide (step 276) status updates regarding the task (e.g., in progress, 30% completed, completed). Reports are generated (step 280) based on the status updates for the each of the tasks, as well as based on feedback received regarding each of the tasks. In some implementations, the workflow and/or task information is updated (step 292) based on information in the report. In some implementations, the resource database is updated (step 294) based on information in the report (e.g., labor resources are updated to include additional capabilities, which are then reflected in their profiles; rating for a labor resource is updated in the labor resource's profile based on a rating received for a completed task).

Thus, the feedback and updating mechanism enables a dynamic workflow that uses adaptive intelligence to learn and improve the workflow with each iteration and completed task.

FIGS. 3A and 3B provide examples of profiles for various types (e.g., distinct types, different types) of labor resources in accordance with some implementations. Labor resources refer to any resource available to the automated workflow application 110 for assignment to a task. Labor resource profiles include information regarding labor resources. Labor resources include various types of labor resources, such as human employees, freelancers, AI agents, and robots.

Human employees are humans that are directly employed by a client, a company, or a user, including full-time and part-time employees. Freelancers are humans that are contracted to work on specific projects and not salaried full-time or part-time employees. Freelancers usually charge on a per-project or hourly basis. In some implementations, freelancers are also referred to as consultants and/or contractors. AI agents are AI-enabled modules that are trained to perform specific tasks. AI agents can include AI employees, which are designed by or trained specifically for or by the client to perform specific functions, including proprietary AI modules. AI agents can also include AI agents that are available to be evoked (e.g., for free or for pay), such as Google Assistant. Robots can include controllable robotic units (such as a remote-controlled drone), as well as automated robots, such as a self-driving car or an autonomous vacuum cleaner. In some implementations, such as when the robot is not fully autonomous and requires a human controller and/or human supervisor, the robotic labor resource includes the controllable robot and a controller and/or supervisor as needed for the robot to perform its functions.

Examples of labor resource profiles and how they are used in identifying candidate labor resources for a specific task, as well as how they are used in the labor resource selection process (e.g., labor resource-task assignment process) are provided herein.

FIG. 3A shows an example of a labor resource profile 310 for a human employee (e.g., human team member) As shown, the labor resource profile 310 includes information regarding the human employee (e.g., Danielle K.), their role and/or expertise (e.g., mechanical engineer), as well as what skills they possess (e.g., CAD, simulation, etc.). The labor resource profile 310 also includes information regarding what tools are available to this labor resource (e.g., AutoCAD, SolidWorks, etc.), information regarding the availability of this labor resource (e.g., Monday-Fridays 9 am-5 μm PT), as well as an indication of their level of experience (e.g., MS in mechanical engineering). The labor resource profile 310 also includes information regarding the reliability of the labor resource, as well as past performance metrics. For example, when a workflow includes an engineering task that requires a human resource, the automated workflow application 110 queries a plurality of labor resource profiles (e.g., in labor resource database 180) to determine suitability for the engineering task. Factors such as skills, availability, and reliability contribute to the resource's allocation score. In this example, the task is a mechanical design task and the labor resource 310 for Daneille K. has a high compatibility and thus, a high allocation score for the task. Danielle K. is assigned to the task over other labor resources such as another human employee who is a software engineer and another human employee who is a chemical engineer. Upon completion of the task, performance metrics and any corrections are logged and used to update the Danielle K,'s profile 310 for future workflow runs. In this example, if Danielle K. executes and completes the task perfectly without any noted corrections or reassignment, her profile 310 will be updated to reflect the high quality of work delivered and her reliability score will increase, and her error rate will decrease. Her number of completed tasks will also be updated to 43 to reflect the newly completed task.

FIG. 3A also shows an example of a labor resource profile 320 for a human freelancer, Jane Doe. Similarly to labor resource profile 310 for a human employee, the labor resource profile 320 also includes information such as the resource name, business role, skills, reliability score, tools, and past activity (e.g., past performance). The labor resource profile 320 also includes a rating for Jane Doe as well as her hourly rate (e.g., cost). For example, if the workflow is for a hot sauce company and includes a design or creative task that is not part of the company's daily function, such as updating the website, the automated workflow application 110 may determine that none of the human employees at the company are suitable for completing the task (e.g., none of them have website design skills and/or access to website design software) and thus, determines that a freelancer is needed to complete this task. The automated workflow application 110 evaluates a plurality of labor resource profiles corresponding to different candidate freelancers and calculates an allocation score to each of the candidates based on cost (e.g., hourly rate), availability, reliability, and skill match. In this example, Jane Doe was selected and assigned to the task. Once Jane Doe has completed the task, the automated workflow application 110 triggers automated payment and updates the performance record in Jane Doe's labor resource profile 320.

In some implementations, cost is expressed in any of: a per project rate, a per use rate, or a per time rate. In some implementations, costs can be fixed (e.g., $20/hr) or varying (e.g., $20/hr for one time use or $15/hr for weekly recurring tasks; overtime rates such as $20/hr for the first 8 hours, $40/hr after 8 hours in any 24 hour period; $40/hr between 9 am-6 μm and $30/hr all other times).

FIG. 3B shows an example of a labor resource profile 330 for an AI agent. The labor resource profile 330 includes name of the AI agent (e.g., "FaultDetectA-Eyes"), what dataset the AI agent was trained on (e.g., labeled manufacturing images), the training goal of the AI agent (e.g., image-based defect detection), digital capabilities that the AI agent has been trained to perform (e.g., image recognition, classification, etc.), and accessible tools that the AI agent has access to (e.g., vision procession API, etc.) The labor resource profile 330 also includes behavior instructions, availability, cost, and performance metrics for the AI agent. In this example, FaultDetectA-Eyes is an AI agent whose services are available by subscription at a month-to-month subscription rate or an annual subscription rate. For example, a workflow may include a data-intensive or highly analytical task, such as identifying defects in images. The automated workflow application 110 may determine that an AI resource is the most appropriate labor resource for this task. The automated workflow application 110 queries labor resource profiles for candidate labor resources and determines allocation scores for the candidate labor resources based on the information provided in the labor resource profile for each candidate labor resource. In this example, the automated workflow application 110 assigned the task to FaultDetectA-Eyes, automatically sets up a subscription for the service, and pays the subscription fee so that FaultDetectA-Eyes is available to complete the task. Once the task is completed, accuracy, errors, confidence scores, and corrections recorded for the task are used to update labor resource profile 330 and weights in the labor resource profile 330 that influence future allocation.

FIG. 3B also shows an example of a labor resource profile 340 for a robotic resource that is an automated robot. The labor resource profile 340 includes an identifier for the automated robot (e.g., "Robot 232"), the role of the robot (e.g., "automated stocker"), physical skills that the robot is capable of performing, a function library for the robot which includes what actions or functions the robot is trained to perform autonomously, load limits of the robot, and safety features for the robot. The function library can include trained or custom taught actions or tasks that are stored within a controller of the autonomous robot (e.g., "pack box," "scan barcode").

The labor resource profile 340 also includes an up-to-date status for the automated robot, which can include indicators of suitability or availability of the robot. For example, a robot that has 0% charge is effectively unavailable and a robot with 20% charge may not be able to complete a complex task. In some implementations, robots are selected for physical tasks based on their capabilities, such as lifting, reach, battery level, and safety clearance. During execution of the task, the automated workflow application 110 transmits actuator-level commands through the robot's controller to operate the autonomous robot. Once the task is completed, any logged corrections, safety events, or incomplete actions are used to update the robot's profile for future workflow runs.

In some implementations, reliability for a labor resource is determined based on reviews, feedback, and historical logs. For example, a robotic resource's reliability score can be affected by logged errors, such as errors in the task output or other errors such as a slow task completion time due to low battery charge or poor battery life (e.g., robot needed to recharge part-way through the task).

FIG. 3C provides an example of a client profile 350 in accordance with some implementations. A client corresponds to user 102 shown in FIG. 1A, where user 102 may be a person acting on behalf of a company or organization. For example, a project manager at a large company may utilize automated workflow application 110 to generate, execute, and manage a workflow for generating quarterly reports. In another example, a small business owner may utilize automated workflow application 110 to keep track of weekly sales and generate monthly orders for new products. Client profiles are used when workflows include customer-specific tasks, approvals, messaging, or report delivery. Client profiles include preferences that influence how AI agents and human resources interact with the client, ensuring workflows use correct channels and output formats. For example, the client profile 350 for Sarah W. indicates that she prefers communication over email and prefers reports in the form of a PDF. A workflow includes a task to deliver quarterly reports to Sarah for approval. Based on Sarah's profile, the automated workflow application 110 will include, in the task information, that the report should be in PDF format and be delivered via email. Thus, access to email and PDF generating software will be included in task requirements when selecting an appropriate labor resource to complete the task.

Tasks in a workflow can be assigned to any labor resource. Thus, in some implementations, a first task in a workflow is assigned to a first resource and a second task in the workflow is assigned to a second resource that is different from the first resource. In some implementations, the same resource can be assigned to two different tasks. Following the example provided, both the first task and a third task in the workflow can be assigned to the first resource.

For example, a workflow for performing quality assurance of a product can include the following tasks and assignments. Robot 232 is assigned to scan inventory (e.g., take images of inventory and barcodes) that are stored on shelves, FaultDetectA-Eyes processes the scanned images looking for incomplete images (e.g., barcode is incomplete or image blurry), a human employee is assigned to review output provided by FaultDetectA-Eyes, and Jane Doe updates the product images and barcodes on the company's website. A summary of the work is sent to Sarah W. via email. As the workflow is executed, the following updates occur as each task is completed. When Robot 232 has completed scanning inventory, the labor resource profile 340 for Robot 232 is updated with the robot's current battery charge and based on the task completion time. Once the human employee finishes reviewing the output from FaultDetectA-Eyes, the labor resource profile 330 for FaultDetectA-Eyes is updated based on any corrections noted by the human employee. Once Jane Doe completes the website update, her labor resource profile 320 with her completion time and a payment is sent to Jane Doe for completion of the work. Additionally, if Jane Doe provides additional feedback on images received (e.g., image for Product 74 is too blurry), that feedback is used to update the reliability in the labor resource profile for the human employee.

Figure 4:
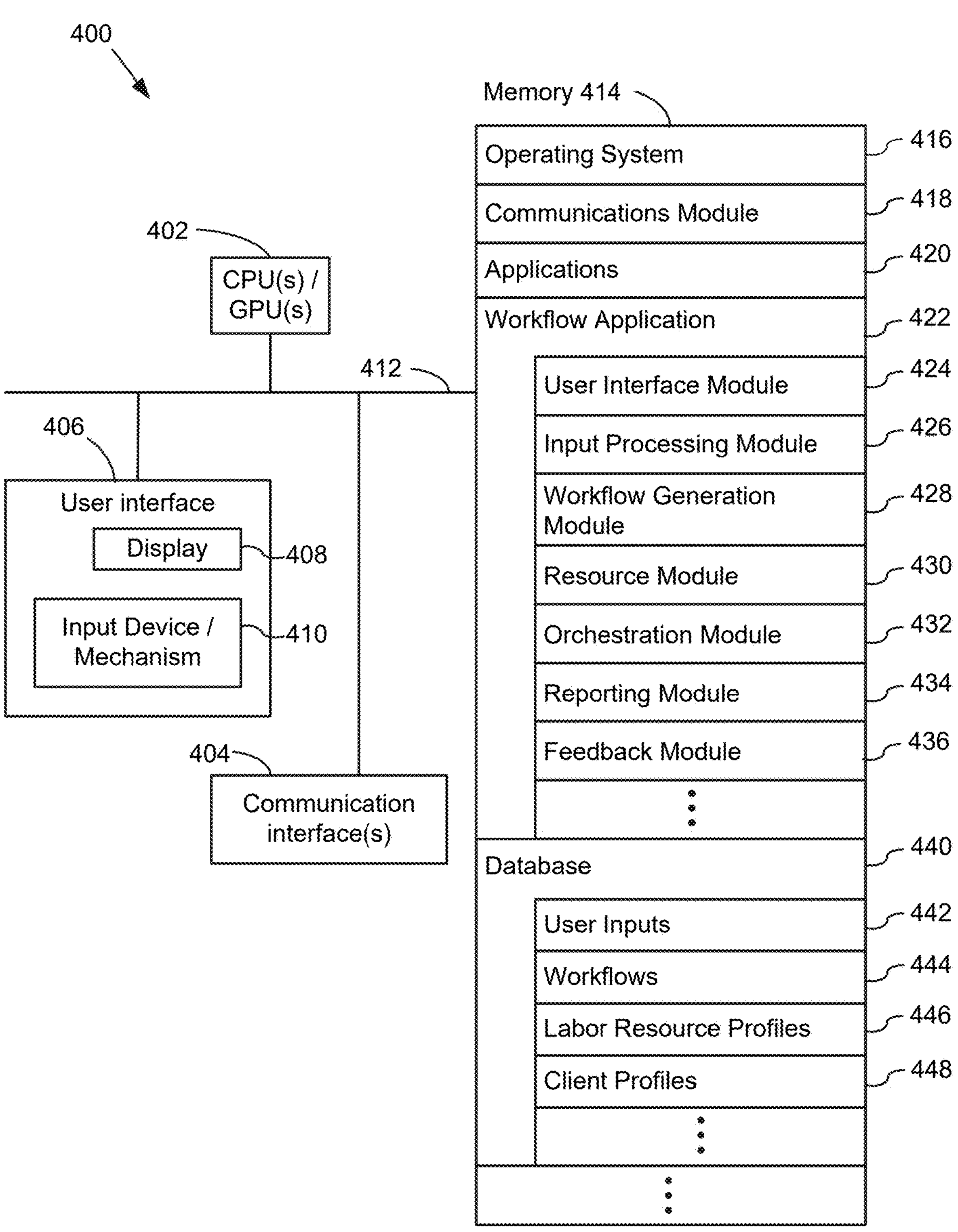
FIG. 4 is a block diagram of an example computing device in accordance with some implementations.
Figure 5A:
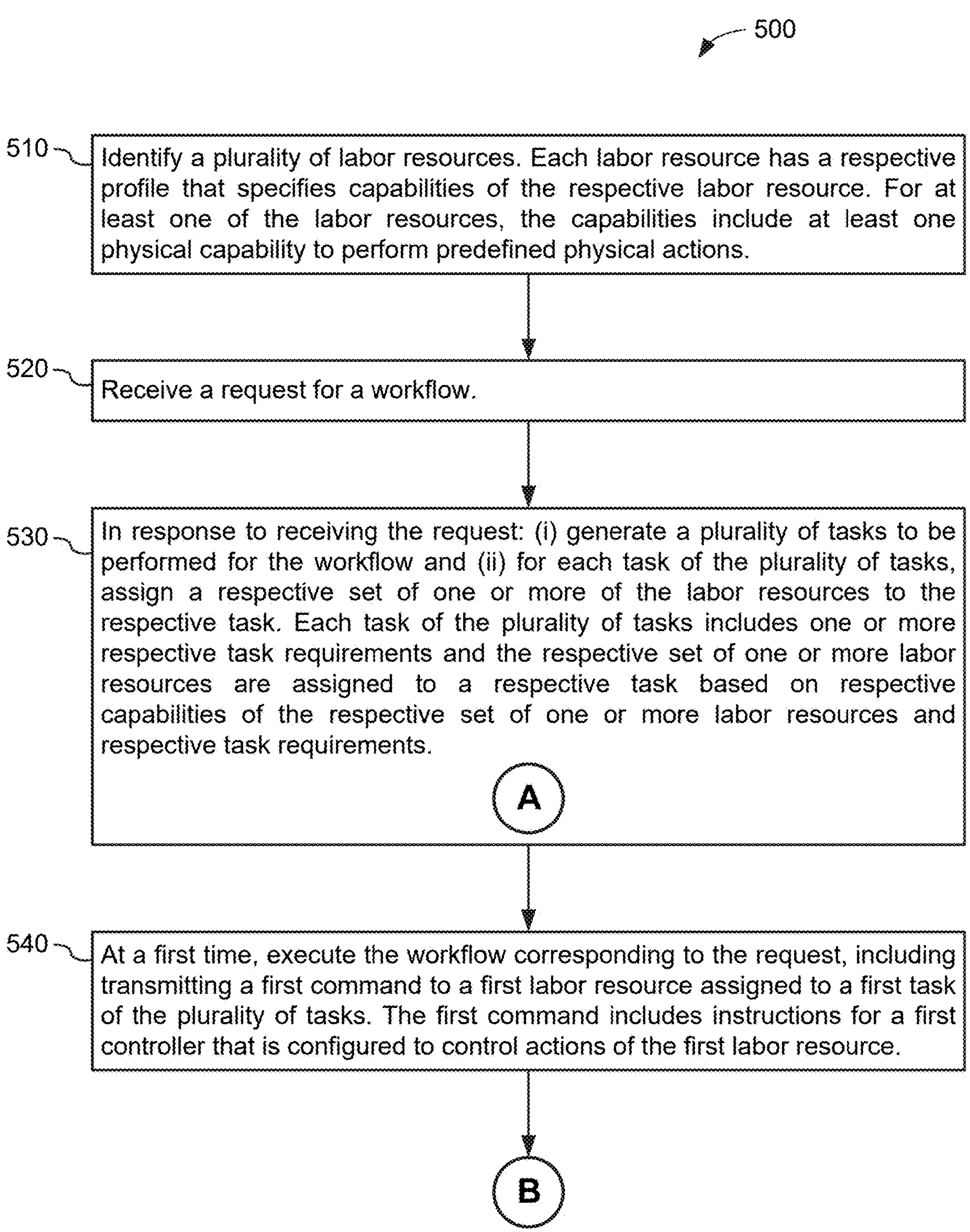
FIGS. 5A-5D provide a flowchart of an example method for orchestrating a unified labor workforce in accordance with some implementations.
Figure 5B:
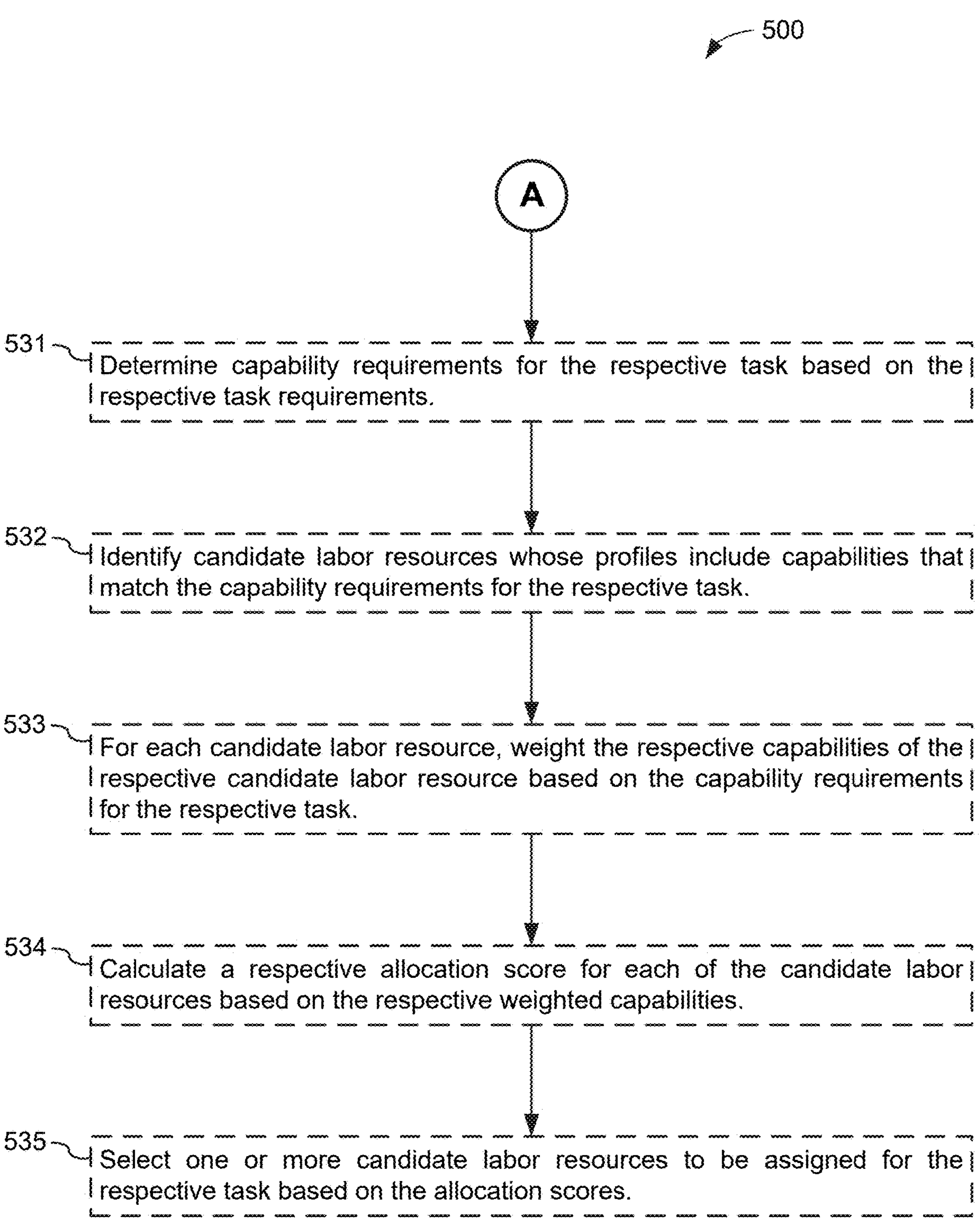
Figure 5C:
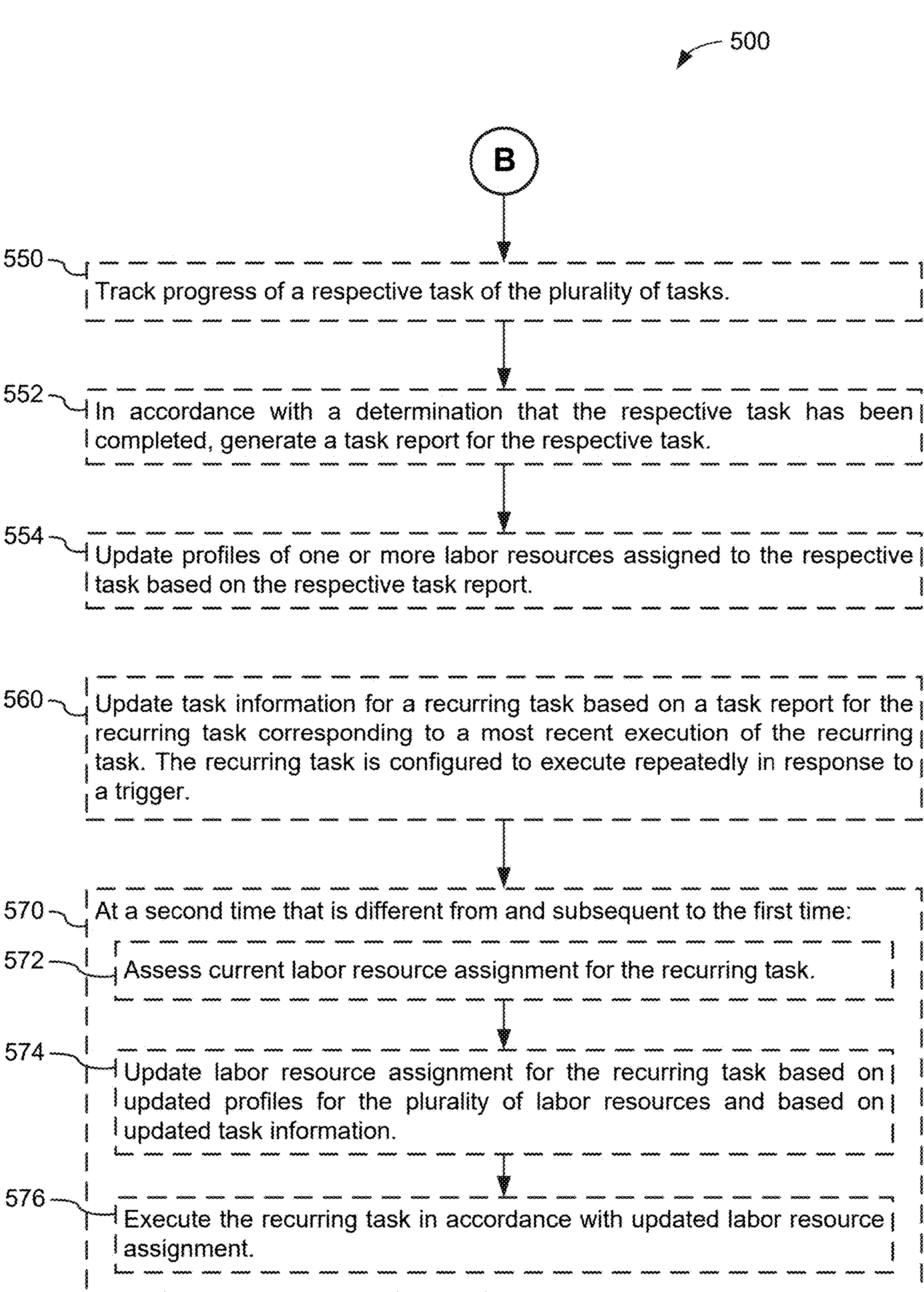
Figure 5D:
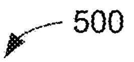
Figure 5D:
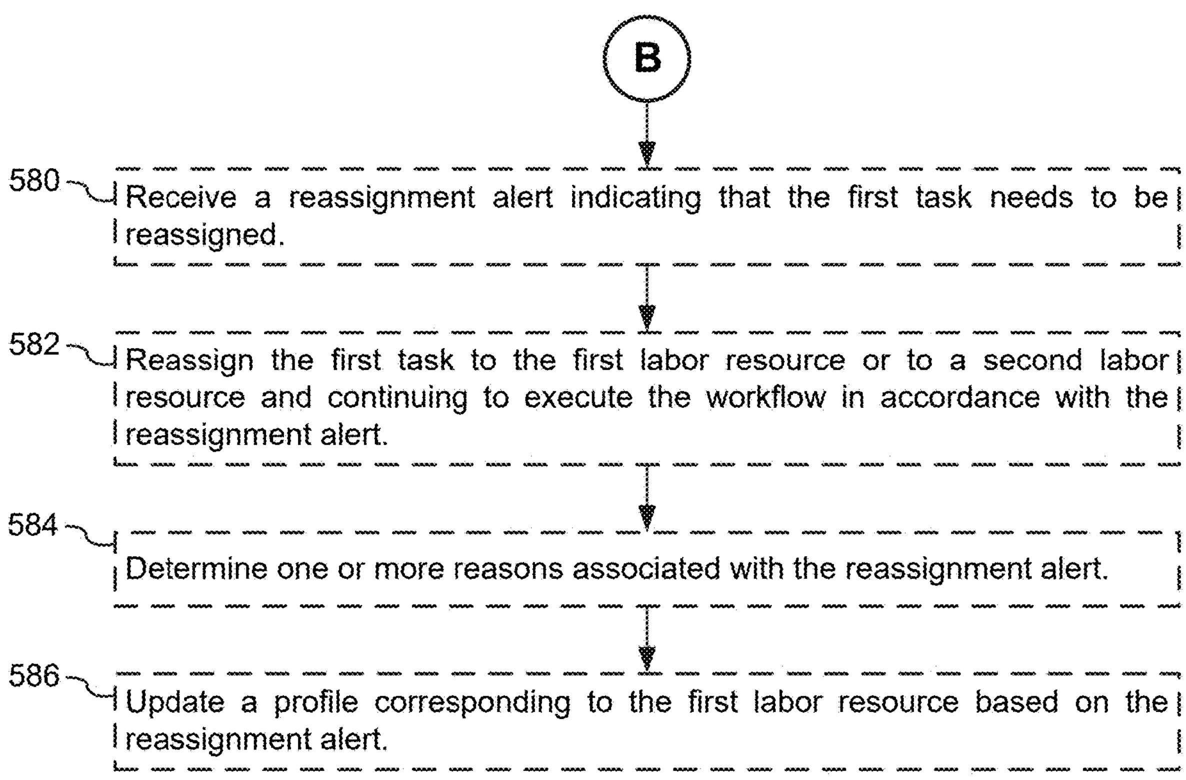

FIG. 4 is a block diagram of a computing device in accordance with some implementations. Various examples of the computing device 400 include a desktop computer, a laptop computer, a tablet computer, and other computing devices (e.g., IT or OT devices) that have a processor capable of running an automated workflow application 422. The computing device 400 typically includes one or more processing units/cores (CPUs) and/or graphical processing units/cores (GPUs) 402 for executing modules, programs, and/or instructions stored in the memory 414 and thereby performing processing operations; one or more network or other communications interfaces 404; memory 414; and one or more communication buses 412 for interconnecting these components. The communication buses 412 may include circuitry that interconnects and controls communications between system components.

The computing device 400 optionally includes a user interface 406 comprising a display device 408 and one or more input devices or mechanisms 410. In some implementations, the input device/mechanism includes a keyboard. In some implementations, the input device/mechanism includes a "soft" keyboard, which is displayed as needed on the display device 408, enabling a user to "press keys" that appear on the display 408. In some implementations, the display 408 and input device/mechanism 410 comprise a touch screen display (also called a touch sensitive display).

In some implementations, the memory 414 includes high-speed random-access memory, such as DRAM, SRAM, DDR RAM, or other random-access solid-state memory devices. In some implementations, the memory 414 includes non-volatile memory, such as one or more magnetic disk storage devices, optical disk storage devices, flash memory devices, or other non-volatile solid state storage devices. In some implementations, the memory 414 includes one or more storage devices remotely located from the CPU(s) and/or GPU(s) 402. The memory 414, or alternatively the non-volatile memory devices within the memory 414, comprises a non-transitory computer-readable storage medium. In some implementations, the memory 414, or the computer-readable storage medium of the memory 414, stores the following programs, modules, and data structures, or a subset thereof:

- an operating system 416, which includes procedures for handling various basic system services and for performing hardware dependent tasks;
- a communications module 418, which is used for connecting the computing device 400 to other computers and devices via the one or more communication network interfaces 404 (wired or wireless) and one or more communication networks, such as the Internet, other wide area networks, local area networks, metropolitan area networks, and so on;
- applications 420, which perform particular tasks or sets of tasks for a user (e.g., word processors, media players, web browsers, and communication platforms);
- an automated workflow application 422, which is configured to generate workflows based on user input, select and assign labor resources to each task within the workflow, and update the workflow, task, and/or labor resource profile based on feedback received on completed tasks. The automated workflow application 422 includes one or more of:
  - a user interface module 424, which is an interface configured to receive user input that includes details for workflow generation;
  - an input processing module 426, which is configured to interpret the user input for workflow generation;
  - a workflow generation module 428, which is configured to generate a workflow based on information received in the user input and interpretation of the user input;
  - a resource module 430, which is configured to identify candidate labor resources for a task, select one of the candidate labor resources to the task, and assign the selected labor resource to the task;
  - an orchestration module 432, which is configured to execute the workflow, including transmitting commands to labor resources, monitoring task and workflow progress;
  - a reporting module 434, which is configured to receive feedback and ratings regarding a completed task and generate a report for the completed task;
  - a feedback module 436, which is configured to update the workflow (e.g., tasks and/or task information) and/or the labor resources based on task reports; and
  - one or more databases 440, which are used by the applications 420 and/or the workflow application 422. The one or more databases 440 include any of: user inputs 442 (e.g., user requests used to generate workflows and tasks), workflows 444 (including tasks), labor resource profiles 446 (including capabilities of various labor resources, such as labor resource profiles 310, 320, 330, and 340 shown in FIGS. 3A and 3B), and client profiles 448 (such as client profile 350 shown in FIG. 3C.

Each of the above identified executable modules, applications, or sets of procedures may be stored in one or more of the previously mentioned memory devices and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 414 stores a subset of the modules and data structures identified above (e.g., the workflow application 422 does not include the input processing module 426). Furthermore, the memory 414 may store additional modules or data structures not described above (e.g., the workflow application 422 further includes a compensation module to process payments to human resources such as employees, contractors, and freelancers).

Although FIG. 4 shows a computing device 400, FIG. 4 is intended more as a functional description of the various features that may be present rather than as a structural schematic of the implementations described herein. In practice, and as recognized by those of ordinary skill in the art, items shown separately could be combined and some items could be separated.

FIGS. 5A-5D provide a flowchart of an example method 500 for orchestrating a unified labor workforce in accordance with some implementations. The method 500 is performed at a computing system (e.g., computing device 400 shown in FIG. 4) having one or more processors and memory. In some implementations, the memory stores one or more programs configured for execution by the one or more processors.

The method 500 includes identifying (step 510) a plurality of labor resources. Each labor resource has a respective profile that specifies capabilities (including digital capabilities and physical capabilities) of the respective labor resource. For at least one of the labor resources, the capabilities include at least one physical capability to perform predefined physical actions. The method 500 also includes receiving a request for a workflow (e.g., receiving user input from user 102 via user device 104) and in response to receiving the request (step 530): (i) generating a plurality of tasks to be performed for the workflow and (ii) for each task of the plurality of tasks, assigning a respective set of one or more of the labor resources to the respective task. Each task of the plurality of tasks includes one or more respective task requirements and the respective set of one or more labor resources are assigned to a respective task based on respective capabilities of the respective set of one or more labor resources and respective task requirements. The method 500 further includes, at a first time, executing (step 540) the workflow corresponding to the request, including transmitting a first command to a first labor resource is assigned to a first task of the plurality of tasks.

In some implementations, assigning a respective set of one or more of the labor resources to a respective task includes determining (step 531) capability requirements for the respective task based on the respective task requirements and identifying (step 532) candidate labor resources whose profiles include capabilities that match the capability requirements for the respective task. The method 500 further includes, for each candidate labor resource, weighting (step 533) the respective capabilities of the respective candidate labor resource based on the capability requirements for the respective task, calculating (step 534) a respective allocation score for each of the candidate labor resources based on the respective weighted capabilities, and selecting (step 535) one or more candidate labor resources to be assigned for the respective task based on the allocation scores.

In some implementations, the method 500 further includes tracking (step 550) progress of a respective task of the plurality of tasks and in accordance with a determination that the respective task has been completed; generating (step 552) a task report for the respective task; and updating (step 554) profiles of one or more labor resources assigned to the respective task based on the respective task report.

In some implementations, the method 500 also includes updating (step 560) task information for a recurring task based on a task report for the recurring task corresponding to a most recent execution of the recurring task. The recurring task is configured to execute repeatedly in response to a trigger. The method 500 further includes at a second time that is different from and subsequent to the first time: assessing (step 572) current labor resource assignment for the recurring task, updating (step 574) labor resource assignment for the recurring task based on updated profiles for the plurality of labor resources and based on updated task information, and executing (step 576) the recurring task in accordance with updated labor resource assignment.

In some implementations, the method 500 further includes receiving (step 580) a reassignment alert indicating that the first task needs to be reassigned, reassigning (step 582) the first task to the first labor resource or to a second labor resource (e.g., that is different from the first labor resource) and continuing to execute the workflow in accordance with the reassignment alert, determining (step 584) one or more reasons associated with the reassignment alert, and updating (step 586) a profile corresponding to the first labor resource based on the reassignment alert.

In some implementations, the one or more robotic resources include automated robots and/or autonomous robots.

In some implementations, the plurality of labor resources includes one or more robotic resources, and the first command includes instructions for a first controller that is configured to control actions of the first labor resource.

In some implementations, the first labor resource is a robotic resource that includes the first controller and a function library storing one or more functions that can be performed by the robotic resource. Each function includes a sequence of physical actions of the robotic resource and the one or more functions in the function library are identified as physical capabilities in a profile for the robotic resource.

In some implementations, the instructions cause the first controller to send electrical signals to one or more actuators of the first labor resource to perform one or more physical actions to complete the first task.

In some implementations, assigning the respective set of one or more of the labor resources for each task of the plurality of tasks further includes: (i) determining capability requirements for the respective task based on the respective task requirements, (ii) identifying candidate labor resources whose profiles include capabilities that match the capability requirements for the respective task, (iii) for each candidate labor resource, weighting the respective capabilities of the respective candidate labor resource based on the capability requirements for the respective task, (iv), calculating a respective allocation score for each of the candidate labor resources based on the respective weighted capabilities, and (iv) selecting one or more candidate labor resources to be assigned for the respective task based on the allocation scores.

In some implementations, the respective allocation score for the candidate labor resource is calculated based on information in the profile for each of the candidate labor resource, including cost, availability, and/or reliability In some implementations, the respective allocation score is calculated based on real-time information regarding a respective capability of the respective candidate resource. Examples of real-time information include information such as current battery life, current queue length, current workload.

In some implementations, for each task of the plurality of tasks, the respective allocation score for a candidate robotic resource is further calculated based on a current charge level of the respective candidate robotic resource, a respective robot battery threshold for the respective candidate robotic resource, clearance of safety checks for the respective candidate robotic resource, and/or physical load limits of the respective candidate robotic resource. For example, calculating the allocation score for a candidate robotic resource can include verifying operational constraints of the robotic resource, such as verifying that the robotic resource has a battery level (e.g., charge) that is above a threshold level, verifying that the robotic resource complies with safety clearance conditions, and verifying that the task has a load limit that is within physical load limits of the robotic resource.

In some implementations, the plurality of labor resources further includes one or more human resources and/or one or more AI resources.

In some implementations, the one or more AI resources includes at least one AI employee and for each AI employee, a respective profile identifies knowledge coverage of the respective AI employee, behavioral instructions that have been applied to the respective AI employee, and/or one or more tools that the respective AI employee is able to access.

In some implementations, the plurality of labor resources includes one or more freelance resources and the respective profile for each freelance resource includes information identifying one or more skillsets of the respective freelance resource, ratings for the respective freelance resource, reliability of the respective freelance resource, cost of the respective freelance resource, and/or availability of the respective freelance resource.

In some implementations, the respective profile for each labor resource specifies which tools and/or databases are available to the respective labor resource and any of: cost of operating the respective resource, availability of the respective resource, and/or reliability of the respective resource. Examples of access to tools and/or databases include: an AI agent that has access to pricing databases, an AI agent with access to a customer relationship management (SRM) tool, an AI agent that can perform functions via an application programming interface (API) such as build an online e-commerce store via Shopify API, and a robotic resource that includes a function library (e.g., library of trained functions, also referred to as a task library or an action library).

In some implementations, the respective task report includes: (i) log comments feedback that includes information from any labor resources assigned to the workflow regarding the respective task, (ii) reassignment alert indicating whether the respective task has been reassigned and any reasons for reassignment, and (iii) a rating feedback indicating a quality of the completed respective task.

In some implementations, the request includes a natural language input provided by a human user.

In some implementations, both the first labor resource and a second labor resource that is different from the first labor resource are assigned to the first task. In such cases, executing (step 540) the workflow corresponding to the request further includes transmitting a second command to the second labor resource. The second command includes instructions for a second controller that is configured to control actions of the second labor resource.

In some implementations, the first command executes a first part of the first task and the second command executes a second part of the first task that is different from the first part of the first task. Thus, multiple resources are receiving instructions and being controlled to perform actions that collaboratively complete the first task.

In some implementations, the first labor resource is a freelance resource. In such cases, the method 500 further includes tracking task progress for the first task and in accordance with a determination that the first task is completed, triggering a payment process for compensating the first labor resource (e.g., in accordance with a contract agreement, rate agreement).

In some implementations, the workflow is executed via an orchestration layer and executing (step 540) the workflow includes transmitting commands to labor resources assigned to the workflow via the orchestration layer. The labor resources include a first type of labor resource and a second type of labor resource that is different from the first type of labor resource. In some implementations, multiple aspects and steps of the workflow are executed by a same orchestration layer. For example, a same orchestration layer may manage workflow generation, resource selection and allocation, task monitoring, and workflow updates based on generated reports.

In some implementations, various tools available are implemented (e.g., exposed) through a same interface (e.g., a single unified interface that is part of the orchestration layer). For example, controllers for robotic resources and access to tools such as a cloud-based e-commerce platform (e.g., Shopify) can be invoked via the same orchestration layer.

Turning now to some example implementations.

(A1) In one aspect, some implementations include a method (e.g., the method 500) that is performed at a computing device (e.g., computing device 400) having memory and one or more processors. The method includes identifying a plurality of labor resources. The plurality of labor resources includes one or more robotic resources. Each labor resource has a respective profile that specifies capabilities of the respective labor resource. For at least one of the labor resources, the capabilities include at least one physical capability to perform predefined physical actions. The method also includes receiving a request for a workflow and in response to receiving the request, generating a plurality of tasks to be performed for the workflow. The method further includes, for each task of the plurality of tasks, assigning a respective set of one or more of the labor resources. Each task of the plurality of tasks includes one or more respective task requirements. The respective set of one or more labor resources are assigned to a respective task based on respective capabilities of the respective set of one or more labor resources and respective task requirements. The method also includes, at a first time, executing the workflow corresponding to the request, including: transmitting a first command to a first labor resource is assigned to a first task of the plurality of tasks, the first command including instructions for a first controller that is configured to control actions of the first labor resource.

(A2) The method of A1, where the one or more robotic resources include automated robots and/or autonomous robots.

(A3) The method of A2, the first labor resource is a robotic resource that includes the first controller. The robotic resource includes a function library storing one or more functions that can be performed by the robotic resource. Each function includes a sequence of physical actions of the robotic resource. The one or more functions in the function library are identified as physical capabilities in a profile for the robotic resource.

(A4) The method of any of A1-A3, where the instructions cause the first controller to send electrical signals to one or more actuators of the first labor resource to perform one or more physical actions to complete the first task.

(A5) The method of any of A1-A4, where assigning the respective set of one or more of the labor resources for each task of the plurality of tasks further includes: (i) determining capability requirements for the respective task based on the respective task requirements; (ii) identifying candidate labor resources whose profiles include capabilities that match the capability requirements for the respective task; (iii) for each candidate labor resource, weighting the respective capabilities of the respective candidate labor resource based on the capability requirements for the respective task; (iv) calculating a respective allocation score for each of the candidate labor resources based on the respective weighted capabilities; and (v) selecting one or more candidate labor resources to be assigned for the respective task based on the allocation scores.

(A6) The method of A5, where the respective allocation score for the candidate labor resource is calculated based on information in the profile for each of the candidate labor resource, including cost, availability, and/or reliability.

(A7) The method of A5, where the respective allocation score is calculated based on real-time information regarding a respective capability of the respective candidate resource.

(A8) The method of any of A1-A7, where for each task of the plurality of tasks, the respective allocation score for a candidate robotic resource is further calculated based on any of: a current charge level of the respective candidate robotic resource, a respective robot battery threshold for the respective candidate robotic resource, clearance of safety checks for the respective candidate robotic resource, and physical load limits of the respective candidate robotic resource.

(A9) The method of any of A1-A8, where the plurality of labor resources further includes one or more human resources and/or one or more AI resources.

(A10) The method of A9, where the one or more AI resources includes at least one AI employee. For each AI employee, a respective profile identifies knowledge coverage of the respective AI employee, behavioral instructions that have been applied to the respective AI employee, and/or one or more tools that the respective AI employee is able to access.

(A11) The method of any of A1-A10, where the plurality of labor resources includes one or more freelance resources. The respective profile for each freelance resource includes any of: information identifying one or more skillsets of the respective freelance resource, ratings for the respective freelance resource, reliability of the respective freelance resource, cost of the respective freelance resource, and availability of the respective freelance resource (A12) The method of A11, where the first labor resource is a freelance resource. The method further includes tracking task progress for the first task and in accordance with a determination that the first task is completed, triggering a payment process for compensating the first labor resource.

(A13) The method of any of A1-A12, where the respective profile for each labor resource specifies which tools and/or databases are available to the respective labor resource and any of: cost of operating the respective resource, availability of the respective resource, and reliability of the respective resource.

(A14) The method of any of A1-A13, where the workflow is executed via an orchestration layer. Executing the workflow includes transmitting commands to labor resources assigned to the workflow via the orchestration layer, the labor resources including a first type of labor resource and a second type of labor resource that is different from the first type of labor resource (A15) The method of any of A1-A14, further including, for each task of the plurality of tasks: (i) tracking progress of the respective task; (ii) in accordance with a determination that the respective task is completed, generating a respective task report of the completed respective task, the respective task report including details regarding performance of one or more respective labor resources assigned to the respective task; and (iii) updating profiles of the respective labor resources based on the performance of the respective labor resource as indicated in the respective task report.

(A16) The method of A15, where the respective task report includes: (i) log comments feedback that includes information from any labor resources assigned to the workflow regarding the respective task, (ii) reassignment alert indicating whether the respective task has been reassigned and any reasons for reassignment, and (iii) a rating feedback indicating a quality of the completed respective task.

(A17) The method of A15, further including, for each task of the plurality of tasks: (i) tracking progress of the respective task, including logging any corrections that were implemented during the respective task; (ii) the respective task report includes details regarding logged corrections; and (iii) profiles of the respective labor resources are updated based on the logged corrections as indicated in the respective task report.

(A18) The method of A15, where the workflow includes a recurring task that is configured to execute repeatedly in response to a trigger. The method includes updating task information for the recurring task based on a task report for the recurring task corresponding to a most recent execution of the recurring task. The method also includes, at a second time that is different from and subsequent to the first time: (i) assessing current labor resource assignment for the recurring task, (ii) updating labor resource assignment for the recurring task based on updated profiles for the plurality of labor resources and based on the updated task information, and (iii) executing the recurring task in accordance with updated labor resource assignment.

(A19) The method of any of A1-A18, further including: (i) receiving a reassignment alert indicating that the first task needs to be reassigned in order to be completed, (ii) reassigning the first task to the first labor resource or to a second labor resource and continuing to execute the workflow in accordance with the reassignment alert, (iii) determining one or more reasons associated with the reassignment alert, and (iv) updating a profile corresponding to the first labor resource based on the reassignment (A20) The method of any of A1-A19, where the request includes a natural language input provided by a human user.

(A21) The method of any of A1-A20, where both the first labor resource and a second labor resource that is different from the first labor resource are assigned to the first task. Executing the workflow corresponding to the request further includes transmitting a second command to the second labor resource, the second command including instructions for a second controller that is configured to control actions of the second labor resource (A22) The method of any of A1-A21, where transmitting a second command to the first labor resource is assigned to the first task. The first command includes instructions for completing a first portion of the first task and the second command includes instructions for completing a second portion of the first task that is different from the first portion of the first task.

(B1) In another aspect, some implementations include a computing device (e.g., computing device 400) that includes one or more processors, memory, a display, and one or more programs stored in the memory and configured for execution by the one or more processors. The one or more programs include instructions for identifying a plurality of labor resources. The plurality of labor resources includes one or more robotic resources. Each labor resource has a respective profile that specifies capabilities of the respective labor resource. For at least one of the labor resources, the capabilities include at least one physical capability to perform predefined physical actions. The one or more programs also include instructions for receiving a request for a workflow and in response to receiving the request, generating a plurality of tasks to be performed for the workflow. The one or more programs further include instructions for, for each task of the plurality of tasks, assigning a respective set of one or more of the labor resources. Each task of the plurality of tasks includes one or more respective task requirements. The respective set of one or more labor resources are assigned to a respective task based on respective capabilities of the respective set of one or more labor resources and respective task requirements. The one or more programs also include instructions for, at a first time, executing the workflow corresponding to the request, including: transmitting a first command to a first labor resource is assigned to a first task of the plurality of tasks, the first command including instructions for a first controller that is configured to control actions of the first labor resource.

(B2) The computing device of B1, where the one or more robotic resources include automated robots and/or autonomous robots.

(B3) The computing device of B2, where the first labor resource is a robotic resource that includes the first controller. The robotic resource includes a function library storing one or more functions that can be performed by the robotic resource. Each function includes a sequence of physical actions of the robotic resource. The one or more functions in the function library are identified as physical capabilities in a profile for the robotic resource.

(B4) The computing device of any of B1-B3, where the one or more programs include instructions that cause the first controller to send electrical signals to one or more actuators of the first labor resource to perform one or more physical actions to complete the first task.

(B5) The computing device of any of B1-B4, where assigning the respective set of one or more of the labor resources for each task of the plurality of tasks further includes: (i) determining capability requirements for the respective task based on the respective task requirements; (ii) identifying candidate labor resources whose profiles include capabilities that match the capability requirements for the respective task; (iii) for each candidate labor resource, weighting the respective capabilities of the respective candidate labor resource based on the capability requirements for the respective task; (iv) calculating a respective allocation score for each of the candidate labor resources based on the respective weighted capabilities; and (v) selecting one or more candidate labor resources to be assigned for the respective task based on the allocation scores.

(B6) The computing device of B5, where the respective allocation score for the candidate labor resource is calculated based on information in the profile for the respective candidate labor resource, including cost, availability, and/or reliability.

(B7) The computing device of B5, where the respective allocation score is calculated based on real-time information regarding a respective capability of the respective candidate resource.

(B8) The computing device of any of B1-B7, where for each task of the plurality of tasks, the respective allocation score for a candidate robotic resource is further calculated based on any of: a current charge level of the respective candidate robotic resource, a respective robot battery threshold for the respective candidate robotic resource, clearance of safety checks for the respective candidate robotic resource, and physical load limits of the respective candidate robotic resource.

(B9) The computing device of any of B1-B8, where the plurality of labor resources further includes one or more human resources and/or one or more AI resources.

(B10) The computing device of B9, where the one or more AI resources includes at least one AI employee. For each AI employee, a respective profile identifies knowledge coverage of the respective AI employee, behavioral instructions that have been applied to the respective AI employee, and/or one or more tools that the respective AI employee is able to access.

(B11) The computing device of any of B1-B10, where the plurality of labor resources includes one or more freelance resources. The respective profile for each freelance resource includes any of: information identifying one or more skill-sets of the respective freelance resource, ratings for the respective freelance resource, reliability of the respective freelance resource, cost of the respective freelance resource, and availability of the respective freelance resource.

(B12) The computing device of B11, where the first labor resource is a freelance resource. The one or more programs further include instructions for tracking task progress for the first task and in accordance with a determination that the first task is completed, triggering a payment process for compensating the first labor resource.

(B13) The computing device of any of B1-B12, where the respective profile for each labor resource specifies which tools and/or databases are available to the respective labor resource and any of: cost of operating the respective resource, availability of the respective resource, and reliability of the respective resource.

(B14) The computing device of any of B1-B13, where the workflow is executed via an orchestration layer. Executing the workflow includes transmitting commands to labor resources assigned to the workflow via the orchestration layer, the labor resources including a first type of labor resource and a second type of labor resource that is different from the first type of labor resource.

(B15) The computing device of any of B1-B14, further including, for each task of the plurality of tasks: (i) tracking progress of the respective task; (ii) in accordance with a determination that the respective task is completed, generating a respective task report of the completed respective task, the respective task report including details regarding performance of one or more respective labor resources assigned to the respective task; and (iii) updating profiles of the respective labor resources based on the performance of the respective labor resource as indicated in the respective task report.

(B16) The computing device of B15, where the respective task report includes: (i) log comments feedback that includes information from any labor resources assigned to the workflow regarding the respective task, (ii) reassignment alert indicating whether the respective task has been reassigned and any reasons for reassignment, and (iii) a rating feedback indicating a quality of the completed respective task.

(B17) The computing device of B15, further including, for each task of the plurality of tasks: (i) tracking progress of the respective task, including logging any corrections that were implemented during the respective task; (ii) the respective task report includes details regarding logged corrections; and (iii) profiles of the respective labor resources are updated based on the logged corrections as indicated in the respective task report.

(B18) The computing device of B15, where the workflow includes a recurring task that is configured to execute repeatedly in response to a trigger. The one or more programs include instructions for updating task information for the recurring task based on a task report for the recurring task corresponding to a most recent execution of the recurring task. The one or more programs also include instructions for, at a second time that is different from and subsequent to the first time: (i) assessing current labor resource assignment for the recurring task, (ii) updating labor resource assignment for the recurring task based on updated profiles for the plurality of labor resources and based on the updated task information, and (iii) executing the recurring task in accordance with updated labor resource assignment.

(B19) The computing device of any of B1-B18, further including: (i) receiving a reassignment alert indicating that the first task needs to be reassigned in order to be completed, (ii) reassigning the first task to the first labor resource or to a second labor resource and continuing to execute the workflow in accordance with the reassignment alert, (iii) determining one or more reasons associated with the reassignment alert, and (iv) updating a profile corresponding to the first labor resource based on the reassignment.

(B20) The computing device of any of B1-B19, where the request includes a natural language input provided by a human user.

(B21) The computing device of any of B1-B20, where both the first labor resource and a second labor resource that is different from the first labor resource are assigned to the first task. Executing the workflow corresponding to the request further includes transmitting a second command to the second labor resource, the second command including instructions for a second controller that is configured to control actions of the second labor resource.

(B22) The computing device of any of B1-B21, where transmitting a second command to the first labor resource is assigned to the first task. The first command includes instructions for completing a first portion of the first task and the second command includes instructions for completing a second portion of the first task that is different from the first portion of the first task.

(C1) In another aspect, some implementations include a non-transitory computer-readable storage medium storing one or more programs configured for execution by a computing device (e.g., computing device 400) having one or more processors, memory, and a display, the one or more programs comprising instructions for identifying a plurality of labor resources. The plurality of labor resources includes one or more robotic resources. Each labor resource has a respective profile that specifies capabilities of the respective labor resource. For at least one of the labor resources, the capabilities include at least one physical capability to perform predefined physical actions. The one or more programs also include instructions for receiving a request for a workflow and in response to receiving the request, generating a plurality of tasks to be performed for the workflow. The one or more programs further include instructions for, for each task of the plurality of tasks, assigning a respective set of one or more of the labor resources. Each task of the plurality of tasks includes one or more respective task requirements. The respective set of one or more labor resources are assigned to a respective task based on respective capabilities of the respective set of one or more labor resources and respective task requirements. The one or more programs also include instructions for, at a first time, executing the workflow corresponding to the request, including: transmitting a first command to a first labor resource is assigned to a first task of the plurality of tasks, the first command including instructions for a first controller that is configured to control actions of the first labor resource.

(C2) The non-transitory computer-readable storage medium of C1, where the one or more robotic resources include automated robots and/or autonomous robots.

(C3) The non-transitory computer-readable storage medium of C2, where the first labor resource is a robotic resource that includes the first controller. The robotic resource includes a function library storing one or more functions that can be performed by the robotic resource. Each function includes a sequence of physical actions of the robotic resource. The one or more functions in the function library are identified as physical capabilities in a profile for the robotic resource.

(C4) The non-transitory computer-readable storage medium of any of C1-C3, where the one or more programs include instructions that cause the first controller to send electrical signals to one or more actuators of the first labor resource to perform one or more physical actions to complete the first task.

(C5) The non-transitory computer-readable storage medium of any of C1-C4, where assigning the respective set of one or more of the labor resources for each task of the plurality of tasks further includes: (i) determining capability requirements for the respective task based on the respective task requirements; (ii) identifying candidate labor resources whose profiles include capabilities that match the capability requirements for the respective task; (iii) for each candidate labor resource, weighting the respective capabilities of the respective candidate labor resource based on the capability requirements for the respective task; (iv) calculating a respective allocation score for each of the candidate labor resources based on the respective weighted capabilities; and (v) selecting one or more candidate labor resources to be assigned for the respective task based on the allocation scores.

(C6) The non-transitory computer-readable storage medium of C5, where the respective allocation score for the candidate labor resource is calculated based on information in the profile for the respective candidate labor resource, including cost, availability, and/or reliability.

(C7) The non-transitory computer-readable storage medium of C5, where the respective allocation score is calculated based on real-time information regarding a respective capability of the respective candidate resource.

(C8) The non-transitory computer-readable storage medium of any of C1-C7, where for each task of the plurality of tasks, the respective allocation score for a candidate robotic resource is further calculated based on any of: a current charge level of the respective candidate robotic resource, a respective robot battery threshold for the respective candidate robotic resource, clearance of safety checks for the respective candidate robotic resource, and physical load limits of the respective candidate robotic resource.

(C9) The non-transitory computer-readable storage medium of any of C1-C8, where the plurality of labor resources further includes one or more human resources and/or one or more AI resources.

(C10) The non-transitory computer-readable storage medium of C9, where the one or more AI resources includes at least one AI employee. For each AI employee, a respective profile identifies knowledge coverage of the respective AI employee, behavioral instructions that have been applied to the respective AI employee, and/or one or more tools that the respective AI employee is able to access.

(C11) The non-transitory computer-readable storage medium of any of C1-C10, where the plurality of labor resources includes one or more freelance resources. The respective profile for each freelance resource includes any of: information identifying one or more skill sets of the respective freelance resource, ratings for the respective freelance resource, reliability of the respective freelance resource, cost of the respective freelance resource, and availability of the respective freelance resource.

(C12) The non-transitory computer-readable storage medium of C11, where the first labor resource is a freelance resource. The one or more programs further include instructions for tracking task progress for the first task and in accordance with a determination that the first task is completed, triggering a payment process for compensating the first labor resource.

(C13) The non-transitory computer-readable storage medium of any of C1-C12, where the respective profile for each labor resource specifies which tools and/or databases are available to the respective labor resource and any of: cost of operating the respective resource, availability of the respective resource, and reliability of the respective resource.

(C14) The non-transitory computer-readable storage medium of any of C1-C13, where the workflow is executed via an orchestration layer. Executing the workflow includes transmitting commands to labor resources assigned to the workflow via the orchestration layer, the labor resources including a first type of labor resource and a second type of labor resource that is different from the first type of labor resource.

(C15) The non-transitory computer-readable storage medium of any of C1-C14, further including, for each task of the plurality of tasks: (i) tracking progress of the respective task; (ii) in accordance with a determination that the respective task is completed, generating a respective task report of the completed respective task, the respective task report including details regarding performance of one or more respective labor resources assigned to the respective task; and (iii) updating profiles of the respective labor resources based on the performance of the respective labor resource as indicated in the respective task report.

(C16) The non-transitory computer-readable storage medium of C15, where the respective task report includes: (i) log comments feedback that includes information from any labor resources assigned to the workflow regarding the respective task, (ii) reassignment alert indicating whether the respective task has been reassigned and any reasons for reassignment, and (iii) a rating feedback indicating a quality of the completed respective task.

(C17) The non-transitory computer-readable storage medium of C15, further including, for each task of the plurality of tasks: (i) tracking progress of the respective task, including logging any corrections that were implemented during the respective task; (ii) the respective task report includes details regarding logged corrections; and (iii) profiles of the respective labor resources are updated based on the logged corrections as indicated in the respective task report.

(C18) The non-transitory computer-readable storage medium of C15, where the workflow includes a recurring task that is configured to execute repeatedly in response to a trigger. The one or more programs include instructions for updating task information for the recurring task based on a task report for the recurring task corresponding to a most recent execution of the recurring task. The one or more programs also include instructions for, at a second time that is different from and subsequent to the first time: (i) assessing current labor resource assignment for the recurring task, (ii) updating labor resource assignment for the recurring task based on updated profiles for the plurality of labor resources and based on the updated task information, and (iii) executing the recurring task in accordance with updated labor resource assignment.

(C19) The non-transitory computer-readable storage medium of any of C1-C18, further including: (i) receiving a reassignment alert indicating that the first task needs to be reassigned in order to be completed, (ii) reassigning the first task to the first labor resource or to a second labor resource and continuing to execute the workflow in accordance with the reassignment alert, (iii) determining one or more reasons associated with the reassignment alert, and (iv) updating a profile corresponding to the first labor resource based on the reassignment.

(C20) The non-transitory computer-readable storage medium of any of C1-C19, where the request includes a natural language input provided by a human user.

(C21) The non-transitory computer-readable storage medium of any of C1-C20, where both the first labor resource and a second labor resource that is different from the first labor resource are assigned to the first task. Executing the workflow corresponding to the request further includes transmitting a second command to the second labor resource, the second command including instructions for a second controller that is configured to control actions of the second labor resource (C22) The non-transitory computer-readable storage medium of any of C1-C21, where transmitting a second command to the first labor resource is assigned to the first task. The first command includes instructions for completing a first portion of the first task and the second command includes instructions for completing a second portion of the first task that is different from the first portion of the first task.

(D1) In another aspect, some implementations include a system (e.g., the system 100) that includes (i) a user interface module (e.g., user interface module 120) configured to receive user input, (ii) an input processing module (e.g., input processing module 130) configured to interpret the user input and generate an input request based on the user input, and (iii) a workflow generation module (e.g., workflow generation module 140) configured to generate a workflow based on the input request. The workflow includes a plurality of tasks and respective task information for a respective task of the plurality of tasks includes one or more task requirements for completing the task. The system also includes a resource module (e.g., resource module 150) configured to, for a respective task of the plurality of tasks: (a) identify candidate labor resources from a plurality of labor resources—each of the candidate labor resources includes respective capabilities, (b) select a respective labor resource from the labor candidate resources based on the respective capabilities of the respective labor resource and the respective task information for the respective task, and (c) assign the selected labor resource to the respective task. The system further includes an orchestration module (e.g., orchestration module 160) configured to execute the workflow, including transmitting respective commands to respective labor resources assigned to respective tasks. The plurality of tasks includes a first task, and the orchestration module is configured to transmit a first command that includes instructions for a first controller that is configured to control actions of a first labor resource that is assigned to the first task.

(D2) The system of D1, where the user input includes natural language input, and the input processing module includes a natural language processing module that is configured to interpret natural language input provided by the user.

(D3) The system of any of D1 and D2, where the resource module is configured to, for each task of the plurality of tasks: (i) receive respective task information regarding the respective task, including requirements for completing the respective task; (ii) identify potential labor resources, from the plurality of labor resources, for completing the respective task; (iii) weigh respective capabilities of each labor resource based on the respective task information; (iv) calculate an allocation score for each of the potential labor resources based on the weighted capabilities of each potential labor resource; and (v) select one or more candidate labor resources to be assigned to the respective task based on the allocation scores.

(D4) The system of any of D1-D3, where the resource module is further configured to, for a respective task of the plurality of tasks, generate task information regarding the respective task.

(D5) The system of any of D1-D4, where the orchestration module is further configured to track progress of the workflow, including tracking progress of a respective task of the plurality of tasks.

(A6) The system of any of D1-D5, further comprising a workflow reporting module (e.g., workflow reporting module 170) configured to: determine whether a respective task of the plurality of tasks has been completed and in response to a determination that the respective task has been completed, trigger a payment process for compensating the one or more respective labor resources assigned to the respective task.

(D7) The system of any of D1-D6, further comprising a feedback module configured to: (i) receive feedback regarding each completed task; (ii) update any of: workflow, task information, and labor resource profile; (iii) determine whether a respective task of the plurality of tasks has been completed; and (iv) in response to a determination that the respective task has been completed, trigger a payment process for compensating the one or more respective labor resources assigned to the respective task.

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method performed at a computing device having memory and one or more processors, the method comprising:

identifying a plurality of labor resources, wherein:

the plurality of labor resources includes one or more robotic resources;

each labor resource has a respective profile that specifies capabilities of the respective labor resource; and for at least one of the labor resources, the capabilities include at least one physical capability to perform predefined physical actions;

receiving a request for a workflow;

in response to receiving the request:

generating a plurality of tasks to be performed for the workflow; and for each task of the plurality of tasks, assigning a respective set of one or more of the labor resources, wherein:

each task of the plurality of tasks includes one or more respective task requirements; and the respective set of one or more labor resources are assigned to a respective task based on respective capabilities of the respective set of one or more labor resources and respective task requirements; and at a first time, executing the workflow corresponding to the request, including:

transmitting a first command to a first labor resource assigned to a first task of the plurality of tasks, wherein:

the first labor resource is a robotic resource that includes a first controller configured to control actions of the first labor resource;

the first command includes instructions for the first controller; and the instructions cause the first controller to send electrical signals to one or more actuators of the first labor resource to perform one or more physical actions to complete the first task.

2. The method of claim 1, wherein the one or more robotic resources include automated robots and/or autonomous robots.

3. The method of claim 1, wherein:

the robotic resource includes a function library storing one or more functions that can be performed by the robotic resource, each function including a sequence of physical actions of the robotic resource; and the one or more functions in the function library are identified as physical capabilities in a profile for the robotic resource.

4. The method of claim 1, wherein assigning the respective set of one or more of the labor resources for each task of the plurality of tasks further includes:

determining capability requirements for the respective task based on the respective task requirements;

identifying candidate labor resources whose profiles include capabilities that match the capability requirements for the respective task;

for each candidate labor resource, weighting the respective capabilities of the respective candidate labor resource based on the capability requirements for the respective task;

calculating a respective allocation score for each of the candidate labor resources based on the respective weighted capabilities; and selecting one or more candidate labor resources to be assigned for the respective task based on the allocation scores.

5. The method of claim 4, wherein the respective allocation score for the candidate labor resource is calculated based on information in the profile for the respective candidate labor resource, including cost, availability, and/or reliability.

6. The method of claim 4, wherein the respective allocation score is calculated based on real-time information regarding a respective capability of the respective candidate resource.

7. The method of claim 1, wherein the respective allocation score for a candidate robotic resource is further calculated based on a current charge level of the respective candidate robotic resource, a respective robot battery threshold for the respective candidate robotic resource, clearance of safety checks for the respective candidate robotic resource, and/or physical load limits of the respective candidate robotic resource.

8. The method of claim 1, wherein the plurality of labor resources further includes one or more human resources and/or one or more AI resources.

9. The method of claim 8, wherein:

the one or more AI resources includes at least one AI employee; and for each AI employee, a respective profile identifies knowledge coverage of the respective AI employee, behavioral instructions that have been applied to the respective AI employee, and/or one or more tools that the respective AI employee is able to access.

10. The method of claim 1, wherein:

the plurality of labor resources includes one or more freelance resources; and the respective profile for each freelance resource includes information identifying any of: one or more skillsets of the respective freelance resource, ratings for the respective freelance resource, reliability of the respective freelance resource, cost of the respective freelance resource, and availability of the respective freelance resource.

11. The method of claim 1, wherein the respective profile for each labor resource specifies which tools and/or databases are available to the respective labor resource and any of: cost of operating the respective resource, availability of the respective resource, and reliability of the respective resource.

12. The method of claim 1, wherein:

the workflow is executed via an orchestration layer; and executing the workflow includes transmitting commands to labor resources assigned to the workflow via the orchestration layer, the labor resources including a first type of labor resource and a second type of labor resource that is different from the first type of labor resource.

13. The method of claim 1, further comprising:

tracking progress of a respective task of the plurality of tasks;

in accordance with a determination that the respective task has been completed, generating a task report for the respective task; and updating profiles of one or more labor resources assigned to the respective task based on the respective task report.

14. The method of claim 13, wherein:

the respective task report includes: (i) log comments feedback that includes information from any labor resources assigned to the workflow regarding the respective task, (ii) reassignment alert indicating whether the respective task has been reassigned and any reasons for reassignment, and (iii) a rating feedback indicating a quality of the completed respective task.

15. The method of claim 13, wherein:

tracking progress of the respective task includes logging any corrections that were implemented during the respective task;

the respective task report includes details regarding logged corrections; and profiles of the respective labor resources are updated based on the logged corrections as indicated in the respective task report.

16. The method of claim 1, further comprising:

receiving a reassignment alert indicating that the first task needs to be reassigned;

reassigning the first task to the first labor resource or to a second labor resource and continuing to execute the workflow in accordance with the reassignment alert;

determining one or more reasons associated with the reassignment alert; and updating a profile corresponding to the first labor resource based on the reassignment alert.

17. The method of claim 1, wherein the workflow includes a recurring task that is configured to execute repeatedly in response to a trigger, the method comprising:

updating task information for the recurring task based on a task report for the recurring task corresponding to a most recent execution of the recurring task;

at a second time that is different from and subsequent to the first time:

assessing current labor resource assignment for the recurring task;

updating labor resource assignment for the recurring task based on updated profiles for the plurality of labor resources and based on the updated task information; and executing the recurring task in accordance with updated labor resource assignment.

18. A computing device, comprising:
one or more processors;
memory;
a display; and
one or more programs stored in the memory and configured for execution by the one or more processors, the one or more programs comprising instructions for:
identifying a plurality of labor resources, wherein:
the plurality of labor resources includes one or more robotic resources;
each labor resource has a respective profile that specifies capabilities of the respective labor resource; and
for at least one of the labor resources, the capabilities include at least one physical capability to perform predefined physical actions;
receiving a request for a workflow;
in response to receiving the request:
generating a plurality of tasks to be performed for the workflow; and
for each task of the plurality of tasks, assigning a respective set of one or more of the labor resources, wherein:
each task of the plurality of tasks includes one or more respective task requirements; and
the respective set of one or more labor resources are assigned to a respective task based on respective capabilities of the respective set of one or more labor resources and respective task requirements; and
at a first time, executing the workflow corresponding to the request, including:
transmitting a first command to a first labor resource assigned to a first task of the plurality of tasks, wherein:
the first labor resource is a robotic resource that includes a first controller configured to control actions of the first labor resource;
the first command includes instructions for the first controller; and
the instructions cause the first controller to send electrical signals to one or more actuators of the first labor resource to perform one or more physical actions to complete the first task.

19. A non-transitory computer-readable storage medium storing one or more programs configured for execution by a computing device having one or more processors, memory, and a display, the one or more programs comprising instructions for:
identifying a plurality of labor resources, wherein:
the plurality of labor resources includes one or more robotic resources;
each labor resource has a respective profile that specifies capabilities of the respective labor resource; and
for at least one of the labor resources, the capabilities include at least one physical capability to perform predefined physical actions;
receiving a request for a workflow;
in response to receiving the request:
generating a plurality of tasks to be performed for the workflow; and
for each task of the plurality of tasks, assigning a respective set of one or more of the labor resources, wherein:
each task of the plurality of tasks includes one or more respective task requirements; and
the respective set of one or more labor resources are assigned to a respective task based on respective capabilities of the respective set of one or more labor resources and respective task requirements; and
at a first time, executing the workflow corresponding to the request, including:
transmitting a first command to a first labor resource assigned to a first task of the plurality of tasks, wherein:
the first labor resource is a robotic resource that includes a first controller configured to control actions of the first labor resource;
the first command includes instructions for the first controller; and
the instructions cause the first controller to send electrical signals to one or more actuators of the first labor resource to perform one or more physical actions to complete the first task.

20. The method of claim 1, wherein executing the workflow corresponding to the request further includes:
transmitting a second command to a second labor resource assigned to a second task of the plurality of tasks, wherein:
the second labor resource is different from the first labor resource;
the second command includes instructions for the second labor resource; and
the second labor resource is a robotic resource, a human resource, or an AI resource.

* * * * *